(12) United States Patent
Zhuang et al.

(10) Patent No.: US 11,909,633 B2
(45) Date of Patent: *Feb. 20, 2024

(54) PACKET PROCESSING METHOD, DEVICE, AND SYSTEM

(71) Applicant: HUAWEI TECHNOLOGIES CO., LTD., Guangdong (CN)

(72) Inventors: Shunwan Zhuang, Beijing (CN); Zhenbin Li, Beijing (CN); Shuanglong Chen, Beijing (CN); Guoyi Chen, Beijing (CN); Jia Che, Beijing (CN); Nan Wu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,507

(22) Filed: Nov. 29, 2021

(65) Prior Publication Data

US 2022/0086086 A1 Mar. 17, 2022

Related U.S. Application Data

(63) Continuation of application No. 16/879,100, filed on May 20, 2020, now Pat. No. 11,218,408, which is a
(Continued)

(30) Foreign Application Priority Data

Sep. 22, 2015 (CN) .......................... 201510608874.X

(51) Int. Cl.
*H04L 45/50* (2022.01)
*H04L 41/00* (2022.01)
(Continued)

(52) U.S. Cl.
CPC ........ *H04L 45/507* (2013.01); *H04L 12/4641* (2013.01); *H04L 41/00* (2013.01); *H04L 47/825* (2013.01)

(58) Field of Classification Search
CPC ... H04L 45/507; H04L 12/4641; H04L 41/00; H04L 47/825; H04L 45/50
See application file for complete search history.

(56) References Cited

U.S. PATENT DOCUMENTS 7,359,377 B1    4/2008  Kompella et al.
7,463,591 B1    12/2008 Kompella et al.
(Continued)

FOREIGN PATENT DOCUMENTS

CN    101741709 A    6/2010
CN    102143030 A    8/2011
(Continued)

OTHER PUBLICATIONS

Y. Rekhter, Ed. et al., A Border Gateway Protocol 4 (BGP-4). Network Working Group, rfc4271, Category: Standards Track. Jan. 2006, 104 pages.
(Continued)

*Primary Examiner* — Ivan O Latorre
(74) *Attorney, Agent, or Firm* — WOMBLE BOND DICKINSON (US) LLP

(57) ABSTRACT

The present disclosure discloses a packet processing method, device, and system. The system includes: a controller, configured to: allocate a service label to a service processing manner of an FEC, establish a mapping relationship between the service label and the service processing manner, send the service label to a source node, and send the mapping relationship to a destination node; the source node, configured to: receive the service label sent by the controller, receive a first packet, insert the service label to the first
(Continued)

```
┌─────────────────────────────────────────────────────┐
│ A controller allocates a service label to a service │  601
│ processing manner of a forwarding equivalence class │
│ FEC, and establishes a mapping relationship between │
│ the service label and the service processing manner │
└─────────────────────────────────────────────────────┘
                          │
                          ▼
┌─────────────────────────────────────────────────────┐
│ The controller sends the service label corresponding│  602
│ to the FEC to a source node corresponding to the    │
│ FEC, so as to instruct the source node to insert the│
│ service label to a first packet corresponding to the│
│ FEC, to obtain a second packet                      │
└─────────────────────────────────────────────────────┘
                          │
                          ▼
┌─────────────────────────────────────────────────────┐
│ The controller sends the mapping relationship to a  │  603
│ destination node corresponding to the FEC, so as to │
│ instruct the destination node to pop the service    │
│ label from the second packet according to the       │
│ mapping relationship, to obtain the first packet    │
└─────────────────────────────────────────────────────┘
``` packet to obtain a second packet, and send the second packet to the destination node; the destination node, configured to: receive the mapping relationship sent by the controller, receive the second packet sent by the source node, and pop the service label from the second packet according to the mapping relationship, to obtain the first packet.

20 Claims, 11 Drawing Sheets

Related U.S. Application Data continuation of application No. 15/926,872, filed on Mar. 20, 2018, now Pat. No. 10,680,942, which is a continuation of application No. PCT/CN2016/096572, filed on Aug. 24, 2016.

(51) Int. Cl.
*H04L 12/46* (2006.01)
*H04L 47/70* (2022.01)

(56) References Cited

U.S. PATENT DOCUMENTS

| 7,702,810 | B1 | 4/2010 | Pan et al. | |
|---|---|---|---|---|
| 7,948,986 | B1 | 5/2011 | Ghosh et al. | |
| 9,049,142 | B1 | 6/2015 | Osborne et al. | |
| 9,246,801 | B1 | 1/2016 | Kompella | |
| 9,300,584 | B1 | 3/2016 | Filsfils et al. | |
| 9,781,030 | B1 | 10/2017 | Torvi | |
| 2004/0165601 | A1 | 8/2004 | Liu et al. | |
| 2005/0125490 | A1 | 6/2005 | Ramia | |
| 2006/0101159 | A1 | 5/2006 | Yeh et al. | |
| 2007/0280251 | A1 | 12/2007 | Wang et al. | |
| 2009/0122801 | A1 | 5/2009 | Chang | |
| 2011/0211579 | A1 | 9/2011 | Cao et al. | |
| 2012/0069745 | A1 | 3/2012 | Kini et al. | |
| 2013/0287027 | A1 | 10/2013 | Ra et al. | |
| 2013/0336315 | A1* | 12/2013 | Guichard | H04L 45/507 370/389 |
| 2014/0177638 | A1* | 6/2014 | Bragg | H04L 45/50 370/395.5 |
| 2014/0269747 | A1 | 9/2014 | Jain et al. | |
| 2015/0103823 | A1* | 4/2015 | Zheng | H04L 45/30 370/389 |
| 2015/0109907 | A1* | 4/2015 | Akiya | H04L 47/125 370/229 |
| 2015/0215198 | A1 | 7/2015 | Wijnands et al. | |
| 2015/0244615 | A1 | 8/2015 | Esale | |
| 2015/0263940 | A1 | 9/2015 | Kini et al. | |
| 2016/0094438 | A1 | 3/2016 | Dutta | |
| 2016/0119228 | A1* | 4/2016 | Gao | H04L 45/50 370/392 |
| 2017/0317929 | A1 | 11/2017 | Chen et al. | |
| 2018/0183711 | A1 | 6/2018 | Xu | |
| 2018/0212872 | A1 | 7/2018 | Zhuang et al. | |

FOREIGN PATENT DOCUMENTS

| CN | 102449964 A | 5/2012 | |
|---|---|---|---|
| CN | 103053133 A | 4/2013 | |
| CN | 103269315 A | 8/2013 | |
| CN | 103354520 A | 10/2013 | |
| CN | 104243311 A | 12/2014 | |
| CN | 104243362 A | 12/2014 | |
| EP | 2720415 B1 | 1/2016 | |
| WO | 2013185715 A1 | 12/2013 | |
| WO | WO-2013189272 A1 * | 12/2013 | H04L 45/30 |

OTHER PUBLICATIONS

T. Bates et al., Multiprotocol Extensions for BGP-4. Network Working Group, rfc4760, Category: Standards Track. Jan. 2007, 12 pages.
PCT/CN2016/096572, International Search Report, dated Nov. 30, 2016, 4 pages.
K. Lougheed et al., A Border Gateway Protocol 4 (BGP-4). Network Working Group, rfc 4271, Category: Standards Track. Jan. 2006, 104 pages.
K. Lougheed et al., A Border Gateway Protocol 3 (BGP-3). Network Working Group, rfc 1267, Oct. 1991, 35 pages.
K. Lougheed et al., A Border Gateway Protocol (BGP). Network Working Group, rfc1163, Jun. 1990, 29 pages.
K. Lougheed et al., A Border Gateway Protocol (BGP). Network Working Group, rfc1105, Jun. 1989, 17 pages.
K. Lougheed et al., A Border Gateway Prolocol 3 (BGP-3). Network Working Group, rfc 1267, Oct. 1991, 35 pages.
K. Kompella, The Use of Entropy Labels in MPLS Forwarding. Rfc6790, Nov. 2012, 25 pages.
Request for Comments: 5586, M. Bocci, Ed et al., MPLS Generic Associated Channel, Jun. 2009, total 19 pages.

* cited by examiner

PACKET PROCESSING METHOD, DEVICE, AND SYSTEM

CROSS-REFERENCE TO RELATED APPLICATIONS

This application is a continuation of U.S. patent application Ser. No. 16/879,100 filed on May 20, 2020, which is a continuation of U.S. patent application Ser. No. 15/926,872, filed on Mar. 20, 2018, now U.S. Pat. No. 10,680,942. The U.S. patent application Ser. No. 15/926,872 is a continuation of International Application No. PCT/CN2016/096572, filed on Aug. 24, 2016, which claims priority to Chinese Patent Application No. 201510608874.X, filed on Sep. 22, 2015. All of the aforementioned applications are hereby incorporated by reference in their entireties.

TECHNICAL FIELD

The present disclosure relates to the field of communications technologies, and in particular, to a packet processing method, device, and system.

BACKGROUND

In a network environment, a packet needs to be forwarded from a source node to a destination node along a forwarding path, so that a data packet is forwarded, and data is transmitted. The source node is also referred to as an ingress node (Ingress Node), and the destination node is also referred to as an egress node (Egress Node). For a network environment that supports multiprotocol label switching (MPLS), different mechanisms may be selected to forward packets, such as an Internet Protocol (IP) routing mechanism, an MPLS mechanism, and a segment routing (SR) mechanism. In packet forwarding mechanisms such as the MPLS mechanism and the segment routing mechanism, the forwarding path is also referred to as a label switched path (LSP).

In a process of forwarding a packet in a network, some service processing needs to be performed on the packet sometimes. For example, when a forwarding node on a forwarding path of the packet has multiple links for selection, to implement load balance on the forwarding node, the forwarding node needs to select, according to a load status of each link, a link to forward the packet.

In the prior art, for a forwarding equivalence class (FEC), to perform service processing on a packet corresponding to the FEC in a forwarding process of the packet, some forwarding nodes on a forwarding path of the FEC need to be statically configured, so that these forwarding nodes can process, in a statically configured service processing manner, the packet corresponding to the FEC. However, because there are a large quantity of FECs in the network environment, and a service processing manner of each FEC needs to be configured for different forwarding nodes, a large quantity of forwarding nodes in the network need to be statically configured. Consequently, work of configuring and maintaining service processing for the network environment is extremely complex, and it is difficult to flexibly implement various service processing in the network environment.

SUMMARY

Embodiments of the present disclosure provide a packet processing method and device, to resolve a prior-art technical problem of complex network configuration and maintenance that is caused because a forwarding node is statically configured to implement service processing.

According to a first aspect, an embodiment of the present disclosure provides a packet processing system, and the system includes:
a controller, configured to: allocate a service label to a service processing manner of a forwarding equivalence class FEC, establish a mapping relationship between the service label and the service processing manner, send the service label to a source node corresponding to the FEC, and send the mapping relationship to a destination node corresponding to the FEC;
the source node, configured to: receive the service label that is corresponding to the FEC and that is sent by the controller, receive a first packet corresponding to the FEC, insert the service label to the first packet to obtain a second packet, and send the second packet to the destination node corresponding to the FEC; and
the destination node, configured to: receive the mapping relationship sent by the controller, receive the second packet sent by the source node corresponding to the FEC, and pop the service label from the second packet according to the mapping relationship, to obtain the first packet.

The service label is used for instructing, in a process of forwarding the second packet from the source node to the destination node, a network device that needs to perform service processing on the second packet to process the second packet in the service processing manner.

Optionally, that the controller sends the service label to the source node includes:
binding, by the controller, the service label to routing information corresponding to the FEC; and
sending, by the controller, the routing information bound with the service label to the source node.

Optionally, that the controller sends the mapping relationship to the destination node includes:
inserting, by the controller, the service label and the service processing manner to network layer reachability information corresponding to the FEC, to form, in the network layer reachability information, the mapping relationship between the service label and the service processing manner; and
sending the network layer reachability information to the destination node.

Optionally, the service processing manner is to perform load sharing processing on a packet, the network device is an intermediate node on a forwarding path from the source node to the destination node, and the service label is an inner label in a label stack of the second packet.

According to a second aspect, an embodiment of the present disclosure provides a packet processing method, and the method includes:
allocating, by a controller, a service label to a service processing manner of a forwarding equivalence class FEC, and establishing a mapping relationship between the service label and the service processing manner;
sending, by the controller, the service label corresponding to the FEC to a source node corresponding to the FEC, so as to instruct the source node to insert the service label to a first packet corresponding to the FEC, to obtain a second packet; and
sending, by the controller, the mapping relationship to a destination node corresponding to the FEC, so as to instruct the destination node to pop the service label from the second packet according to the mapping relationship, to obtain the first packet.

The service label is used for instructing, in a process of forwarding the second packet from the source node to the destination node, a network device that needs to perform service processing on the second packet to process the second packet in the service processing manner.

Optionally, the sending, by the controller, the service label corresponding to the FEC to a source node corresponding to the FEC, so as to instruct the source node to insert the service label to a first packet corresponding to the FEC, to obtain a second packet includes:
  binding, by the controller, the service label to routing information corresponding to the FEC; and
  sending, by the controller, the routing information bound with the service label to the source node, so as to instruct the source node to insert the service label to the first packet, to obtain the second packet.

Optionally, the sending, by the controller, the mapping relationship to a destination node corresponding to the FEC, so as to instruct the destination node to pop the service label from the second packet according to the mapping relationship, to obtain the first packet includes:
  inserting, by the controller, the service label and the service processing manner to network layer reachability information corresponding to the FEC, to form, in the network layer reachability information, the mapping relationship between the service label and the service processing manner; and
  sending, by the controller, the network layer reachability information to the destination node, so as to instruct the destination node to pop the service label from the second packet according to the mapping relationship, to obtain the first packet.

According to a third aspect, an embodiment of the present disclosure provides another packet processing method, and the method includes:
  receiving, by a source node, a service label that is corresponding to a forwarding equivalence class FEC and that is sent by a controller, where the service label is allocated by the controller to a service processing manner of the FEC, and the source node is a source node corresponding to the FEC;
  receiving, by the source node, a first packet corresponding to the FEC, and inserting the service label to the first packet, to obtain a second packet; and
  sending, by the source node, the second packet to a destination node corresponding to the FEC, so as to instruct the destination node corresponding to the FEC to pop the service label from the second packet according to a mapping relationship between the service label and the service processing manner, to obtain the first packet, where the mapping relationship is established by the controller and sent to the destination node.

The service label is used for instructing, in a process of forwarding the second packet from the source node to the destination node, a network device that needs to perform service processing on the second packet to process the second packet in the service processing manner.

Optionally, the receiving, by a source node, a service label that is corresponding to an FEC and that is sent by a controller includes:
  receiving, by the source node, routing information that is corresponding to the FEC and that is sent by the controller; and
  obtaining, by the source node, the service label bound to the routing information.

According to a fourth aspect, an embodiment of the present disclosure provides still another packet processing method, and the method includes:
  receiving, by a destination node, a mapping relationship that is between a service label and a service processing manner and that is sent by a controller, where the service label is allocated by the controller to the service processing manner of a forwarding equivalence class FEC, and the destination node is a destination node corresponding to the FEC;
  receiving, by the destination node, a second packet that is sent by a source node corresponding to the FEC, where the second packet is obtained by inserting, by the source node, the service label to a first packet corresponding to the FEC; and
  popping, by the destination node, the service label from the second packet according to the mapping relationship, to obtain the first packet.

The service label is used for instructing, in a process of forwarding the second packet from the source node to the destination node, a network device that needs to perform service processing on the second packet to process the second packet in the service processing manner.

Optionally, the receiving, by a destination node, a mapping relationship between a service label and a service processing manner includes:
  receiving, by the destination node, network layer reachability information that is corresponding to the FEC and that is sent by the controller; and
  obtaining, by the destination node, the service label and the service processing manner from the network layer reachability information, to obtain the mapping relationship between the service label and the service processing manner.

According to a fifth aspect, an embodiment of the present disclosure provides a controller, and the controller includes:
  an allocation module, configured to allocate a service label to a service processing manner of a forwarding equivalence class FEC;
  an establishment module, configured to establish a mapping relationship between the service label and the service processing manner;
  a first sending module, configured to send the service label corresponding to the FEC to a source node corresponding to the FEC, so as to instruct the source node to insert the service label to a first packet corresponding to the FEC, to obtain a second packet; and
  a second sending module, configured to send the mapping relationship to a destination node corresponding to the FEC, so as to instruct the destination node to pop the service label from the second packet according to the mapping relationship, to obtain the first packet.

The service label is used for instructing, in a process of forwarding the second packet from the source node to the destination node, a network device that needs to perform service processing on the second packet to process the second packet in the service processing manner.

Optionally, the first sending module includes:
  a binding submodule, configured to bind the service label to routing information corresponding to the FEC; and
  a first sending submodule, configured to send the routing information bound with the service label to the source node, so as to instruct the source node to insert the service label to the first packet, to obtain the second packet.

Optionally, the second sending module includes:

an insertion submodule, configured to insert the service label and the service processing manner to network layer reachability information corresponding to the FEC, to form, in the network layer reachability information, the mapping relationship between the service label and the service processing manner; and a second sending submodule, configured to send the network layer reachability information to the destination node, so as to instruct the destination node to pop the service label from the second packet according to the mapping relationship, to obtain the first packet.

According to a sixth aspect, an embodiment of the present disclosure provides a source node device, and the device includes:

a first receiving module, configured to receive a service label that is corresponding to a forwarding equivalence class FEC and that is sent by a controller, where the service label is allocated by the controller to service processing manner of the FEC, and the source node is a source node corresponding to the FEC;

a second receiving module, configured to receive a first packet corresponding to the FEC;

an insertion module, configured to insert the service label to the first packet, to obtain a second packet; and a first sending module, configured to send the second packet to a destination node corresponding to the FEC, so as to instruct the destination node corresponding to the FEC to pop the service label from the second packet according to a mapping relationship between the service label and the service processing manner, to obtain the first packet, where the mapping relationship is established by the controller and sent to the destination node.

The service label is used for instructing, in a process of forwarding the second packet from the source node to the destination node, a network device that needs to perform service processing on the second packet to process the second packet in the service processing manner.

According to a seventh aspect, an embodiment of the present disclosure provides a destination node device, and the device includes:

a first receiving module, configured to receive a mapping relationship that is between a service label and a service processing manner and that is sent by a controller, where the service label is allocated by the controller to the service processing manner of a forwarding equivalence class FEC, and the destination node is a destination node corresponding to the FEC;

a second receiving module, configured to receive a second packet that is sent by a source node corresponding to the FEC, where the second packet is obtained by inserting, by the source node, the service label to a first packet corresponding to the FEC; and a popping module, configured to pop the service label from the second packet according to the mapping relationship, to obtain the first packet.

The service label is used for instructing, in a process of forwarding the second packet from the source node to the destination node, a network device that needs to perform service processing on the second packet to process the second packet in the service processing manner.

Compared with the prior art, embodiments of the present disclosure have at least the following advantages:

According to the technical solutions in the embodiments of the present disclosure, the controller allocates the service label, delivers the service label to the source node, and delivers the mapping relationship between the service label and the service processing manner to the destination node. The source node can insert, without static configuration, the service label to the packet, and the destination node can pop, without static configuration, the service label from the packet. In this way, in the process of forwarding the packet from the source node to the destination node, the network device can perform service processing on the packet according to the service label in the packet. It can be seen that service processing can be performed on the packet in the forwarding process of the packet without statically configuring a forwarding node. Therefore, a quantity of devices that need to be statically configured is reduced significantly, and work of configuring and maintaining service processing for a network environment is simplified, so that various service processing in the network environment can be flexibly implemented. In addition, the controller allocates the service label, delivers the service label to the source node, and delivers the mapping relationship to the destination node, so that the packet carries, in the forwarding process, service labels that are used to carry multiple different service processing requirements, and the service labels can flexibly form various combinations and be inserted to the packet, so that the packet is flexibly processed according to various combinations of service processing manners. Therefore, an MPLS label can be flexibly applied to an application scenario with multiple service requirements.

BRIEF DESCRIPTION OF DRAWINGS

To describe the technical solutions in the embodiments of this application more clearly, the following briefly describes the accompanying drawings required for describing the embodiments or the prior art. Apparently, the accompanying drawings in the following description show merely some embodiments recorded in this application, and persons of ordinary skill in the art may still derive other drawings from these accompanying drawings.

DESCRIPTION OF EMBODIMENTS

To make persons skilled in the art understand the technical solutions in the present disclosure better, the following clearly describes the technical solutions in the embodiments of the present disclosure with reference to the accompanying drawings in the embodiments of the present disclosure. Apparently, the described embodiments are merely a part rather than all of the embodiments of the present disclosure.

It is found that, to perform service processing on a packet in a network environment, and considering that there are usually multiple FECs in the network environment and packets corresponding to different FECs need to be processed in different service processing manners, a network device needs to specifically perform service processing on the packet. Therefore, in a forwarding process of the packet, indication information used to identify a service processing manner may be added to the packet, so that the network device can determine, by reading the indication information, to perform corresponding service processing on the packet. To enable the packet to have the indication information in the forwarding process, the indication information needs to be added to the packet on a source node on a forwarding path, and the indication information needs to be popped on a destination node on the forwarding path. Therefore, in the prior art, for an FEC, a source node and a destination node corresponding to the FEC need to be statically configured, so that the source node can add the indication information to a packet corresponding to the FEC, and the destination node can pop indication information from the packet corresponding to the FEC. However, in an actual network, there may be a large quantity of forwarding nodes between the source node and the destination node corresponding to the FEC. Therefore, in the prior art, to implement service processing in a network environment, the large quantity of forwarding nodes need to be statically configured. Consequently, network configuration and maintenance work is extremely complex, and it is difficult to flexibly implement service processing.

Figure 1:
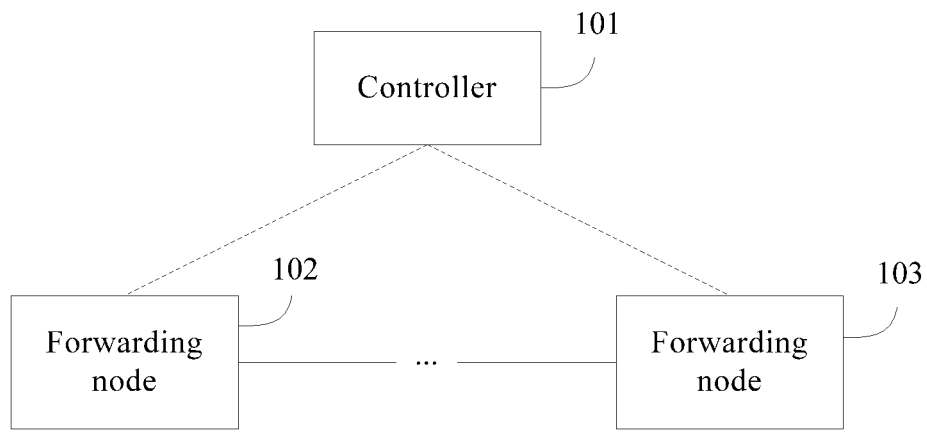
FIG. 1 is a schematic diagram of a system framework related to an application scenario according to an embodiment of the present disclosure.

Referring to FIG. 1, FIG. 1 is a schematic diagram of an application network scenario in an implementation of the present disclosure. The network scenario includes a controller (controller) 101, a forwarding node 102, and a forwarding node 103. The controller 101 may be a controller in a network architecture in which control is separated from forwarding, and the forwarding node 102 and the forwarding node 103 may be forwarding nodes in the network architecture in which control is separated from forwarding. For an FEC, on a forwarding path corresponding to the FEC, the forwarding node 102 is a source node, and the forwarding node 103 is a destination node. In the network scenario shown in FIG. 1, the controller 101 may allocate a service label to a service processing manner of the FEC, and establish a mapping relationship between the service label and the service processing manner. The controller 101 may send the service label to the forwarding node 102, and send the mapping relationship to the forwarding node 103. When receiving a first packet corresponding to the FEC, the forwarding node 102 may insert the service label that is received from the controller 101 to the first packet, to obtain a second packet, and send the second packet to the forwarding node 103. When receiving the second packet, the forwarding node 103 may pop the service label from the second packet according to the mapping relationship that is received from the controller 101, to obtain the first packet. In a process of forwarding the second packet from the forwarding node 102 to the forwarding node 103, a network device that needs to perform service processing on the second packet may select the corresponding service processing manner according to the service label in the second packet, to process the second packet.

In the foregoing application scenario, on the forwarding path from the forwarding node 102 to the forwarding node 103, the packet corresponding to the FEC may not pass through any intermediate node, or may pass through one or more intermediate nodes. This is not limited in this embodiment of the present disclosure.

It should be noted that the foregoing application scenario is shown merely for facilitating understanding of a principle of the present disclosure, and an implementation of the present disclosure is not limited in this aspect. The implementation of the present disclosure may be applied to any applicable scenario.

Implementations of a packet processing method, a related device, and a related system in the present disclosure are described in detail below by using embodiments and with reference to the accompanying drawings.

Figure 2:
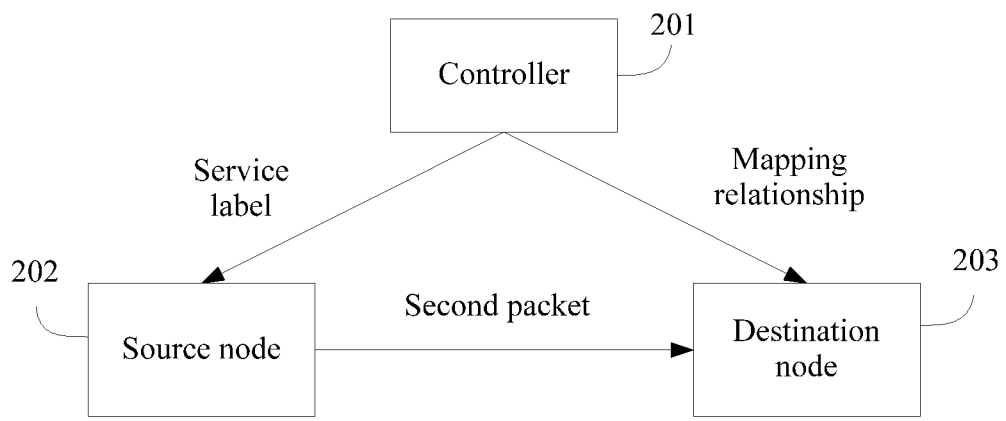
FIG. 2 is a schematic structural diagram of a packet processing system according to an embodiment of the present disclosure.

Referring to FIG. 2, FIG. 2 is a schematic diagram of a packet processing system according to an embodiment of the present disclosure. In this embodiment, the system includes:

a controller 201, configured to: allocate a service label to a service processing manner corresponding to an FEC, establish a mapping relationship between the service label and the service processing manner, send the service label corresponding to the FEC to a source node 202 corresponding to the FEC, and send the mapping relationship to a destination node 203 corresponding to the FEC;

the source node 202, configured to: receive the service label that is corresponding to the FEC and that is sent by the controller 201, receive a first packet corresponding to the FEC, insert the service label to the first packet to obtain a second packet, and send the second packet to the destination node 203 corresponding to the FEC; and the destination node 203, configured to: receive the mapping relationship sent by the controller 201, receive the second packet sent by the source node 202 corresponding to the FEC, and pop the service label from the second packet according to the mapping relationship, to obtain the first packet.

The service label is used for instructing, in a process of forwarding the second packet from the source node 202 to the destination node 203, a network device that needs to perform service processing on the second packet to process the second packet in the service processing manner.

In this embodiment, for any FEC in a network environment, the controller 201 may configure a corresponding service processing manner for the FEC. Specifically, the controller 201 may allocate, according to a service processing manner in which a packet corresponding to the FEC needs to be performed, a service label that is used to identify the service processing manner to the FEC, and establish a mapping relationship between the service label and the service processing manner. Then, the controller 201 may deliver the service label to the source node 202 corresponding to the FEC, so that the source node 202 may save the service label and the FEC. The controller 201 may deliver the mapping relationship to the destination node 203 corresponding to the FEC, so that the destination node 203 saves the mapping relationship. If the source node 202 stores the service label corresponding to the FEC, when receiving a first packet corresponding to the FEC, the source node 202 may insert the service label to the first packet to obtain a second packet, and send the second packet to the destination node 203. When the destination node 203 receives the second packet, the destination node 203 may identify, according to the mapping relationship, the service label that is inserted to the second packet, and pop the service label from the second packet, to obtain the first packet. Therefore, a process of forwarding the first packet in the network environment is completed. In the process of forwarding the second packet from the source node 202 to the destination node 203, the network device that needs to perform service processing on the second packet may determine, by reading the service label in the second packet, that the second packet is corresponding to the service processing manner, so that the second packet can be processed in the service processing manner.

In this embodiment, a sequence of performing the action of delivering the service label by the controller 201 and the action of delivering the mapping relationship by the controller 201 may not be limited. For example, the controller 201 may deliver the service label to the source node 202 and deliver the mapping relationship to the destination node 203 at the same time. For another example, the controller 201 may first deliver the mapping relationship to the destination node 203, and then deliver the service label to the source node 202.

The FEC in this embodiment may be an FEC that is formed by classifying groups in any manner. For example, groups may be classified by using IP address prefixes of destination addresses to form the FEC, that is, packets corresponding to a same FEC have destination addresses with a same IP address prefix. In this case, when the controller 201 allocates the service label to the service processing manner of the FEC, the controller 201 may bind the service label and the IP address prefix, and send the service label and the IP address prefix to the source node 202, and the source node 202 may save the service label and the IP address prefix. In this way, when receiving a packet, the source node 202 may identify a destination address of the packet. If the source node 202 learns after identification that the destination address of the packet has the IP address prefix, the source node 202 may insert, to the packet, the saved service label corresponding to the IP address prefix.

In a specific implementation, to enable the controller 201 to deliver the service label corresponding to the FEC to the source node 202, the controller 201 may deliver routing information corresponding to the FEC to the source node 202. Specifically, the controller 201 binds the service label to the routing information corresponding to the FEC, and the controller 201 sends the routing information to the source node 202. The service label corresponding to the FEC may be bound to the routing information corresponding to the FEC by extending the Border Gateway Protocol (BGP). Specifically, the routing information corresponding to the FEC may be carried in network layer reachability information (NLRI) of the BGP. The service label corresponding to the FEC may be used as a BGP attribute and bound to the NLRI that carries the routing information. In this way, the controller 201 delivers the network layer reachability information to the source node 202, so that the routing information and the service label that are corresponding to the FEC can be delivered to the source node 202.

In a specific implementation, to enable the controller 201 to deliver the mapping relationship between the service label and the service processing manner to the destination node 203, the mapping relationship may be carried in the NLRI of the BGP, and the controller 201 delivers the NLRI to the destination node 203, to deliver the mapping relationship. Specifically, the controller 201 inserts the service label and the service processing manner to the NLRI corresponding to the FEC, to form, in the NLRI, the mapping relationship between the service label and the service processing manner. The controller 201 sends the NLRI to the destination node 203.

Figure 3:
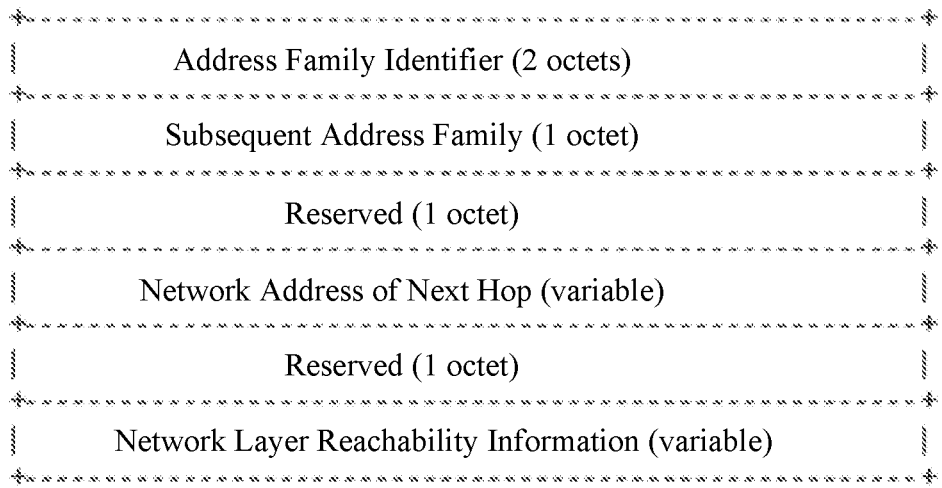
FIG. 3 is a schematic diagram of a format of network layer reachability information according to an embodiment of the present disclosure.

To add the mapping relationship to the NLRI, multiprotocol reachable NLRI (MP_Reach_NLRI) shown in FIG. 3 may be obtained by extending the BGP, and the MP_Reach_NLRI may be used to carry the mapping relationship.

"Address Family Identifier" is an address family identifier field, and this field is used to carry an address family identifier of a network protocol, such as an IPv4 (Internet Protocol version 4) identifier and an IPv6 (Internet Protocol version 6) identifier.

"Subsequent Address Family" is a subsequent address family identifier field, and this field is used to carry identification information of an NLRI type. For an NLRI type indicating that the NLRI carries the mapping relationship, another piece of identification information may be added, and the identification information is used to indicate that the NLRI includes the mapping relationship.

Two "Reserved" are both reserved fields.

"Network Address of Next Hop" is a next-hop network address field, and this field is used to carry an address of a next forwarding node on a route.

"Network Layer Reachability Information" is a network layer reachability information field, and for the NLRI that carries the mapping relationship, this field may be used to carry the mapping relationship.

Figure 4:
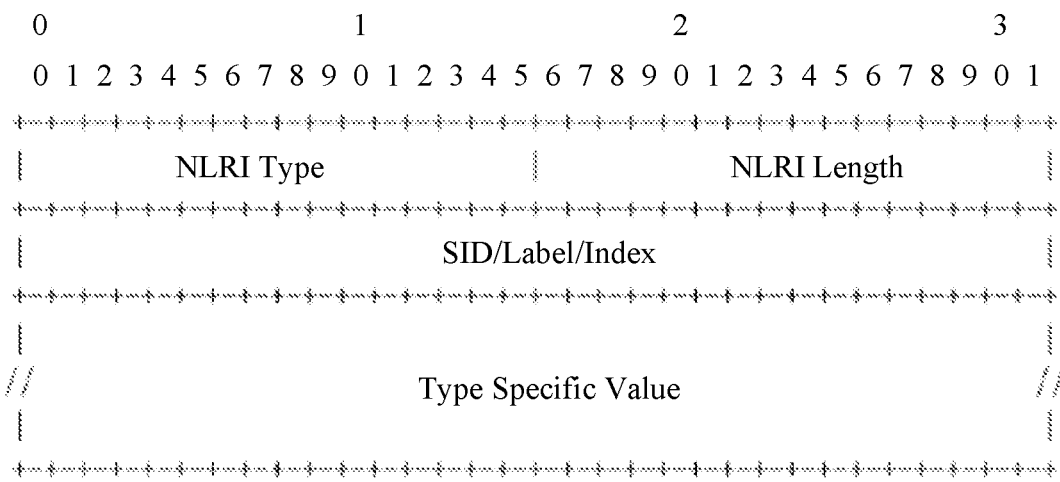
FIG. 4 is a schematic diagram of a format of a network layer reachability information field according to an embodiment of the present disclosure.

The NLRI field may carry the mapping relationship by using a format shown in FIG. 4.

"NLRI Type" is an NLRI type field, and this field is used to carry a type of a service label, the type of the service label may be used to represent a service processing manner corresponding to the service label, for example, if the type of the service label is an entropy label, that is, the service label is an entropy label, a service processing manner corresponding to the entropy label is a load sharing service.

"NLRI Length" is an NLRI length field, and this field is used to carry information that indicates an NLRI field length.

"SID/Label/Index" is a service identifier field, and this field may be used to carry a segment identifier (SID), a service label (Label), or an index.

"Type Specific Value" is a type specific value field, and this field is used to carry description information of a service processing manner.

It can be seen that, in the NLRI field format shown in FIG. 4, the service label may be inserted to the SID/Label/Index field, and the service processing manner may be inserted to the type specific value field, so that the MP_Reach_NLRI can carry the mapping relationship between the service label and the service processing manner. The controller 201 delivers the MP_Reach_NLRI to the destination node 203, and the destination node 203 may learn, by means of reading, that the MP_Reach_NLRI has the service label and the service processing manner, so as to determine that the service label is used to identify the service processing manner.

In a specific implementation, the service processing manner may include: performing load sharing processing on a packet, performing source identification processing on a service flow, performing packet coloring processing, or the like. The source identification processing performed on the service flow is mainly used to identify a source of a service flow in an operation, administration and maintenance (OAM) process of a service such as a layer 3 virtual private network (L3VPN). The coloring processing is mainly used to color the service flow in the OAM process. A service label allocated for the load sharing processing is an entropy label (Entropy Label), a service label allocated for the source identification processing is a source label (Source Label), and a service label allocated for the coloring processing is a color label (Color Label).

For a packet that needs to be forwarded from the source node 202 to the destination node 203, some service processing may be performed by the controller 201, some service processing may be performed by the destination node 203, and some service processing may be performed by an intermediate node on a forwarding path of the packet. For example, the intermediate node is responsible for performing load sharing processing on the packet, the controller 201 is responsible for performing source identification processing on the packet, and the destination node 203 is responsible for performing coloring processing on the packet.

In a specific implementation, for the load sharing processing performed by the intermediate node, to implement such a service processing manner of the load sharing processing, the intermediate node may be configured to obtain an entropy label of the second packet in a preset manner, and perform the load sharing processing on the second packet according to the entropy label. The entropy label is a service label that is used to indicate the load sharing processing. The second packet may be formed by inserting, by the source node 202, the entropy label to the first packet as an inner label, that is, the entropy label may be an inner label of the second packet. Considering that the intermediate node is usually responsible for only the load sharing processing, the intermediate node may not need to identify a service processing manner represented by each service label, but need to identify only the entropy label in the second packet. Therefore, the intermediate node may identify the entropy label in the second packet in a manner preset by the intermediate node, and does not need to use the mapping relationship that is between the service label and the service processing manner and that is established by the controller. Therefore, the controller 201 does not need to deliver the mapping relationship between the service label and the service processing manner to the intermediate node. For example, the manner preset by the intermediate node may be that the last label in a label stack of the second packet may be identified as the entropy label. In this case, the source node 202 may insert the entropy label to the label stack of the second packet as the last label in the manner preset by the intermediate node. For another example, the manner preset by the intermediate node may be that a label next to an entropy label identifier in the second packet is identified as the entropy label. In this case, when inserting the entropy label to the first packet, the source node 202 may insert the entropy label identifier to the label stack before the entropy label in the manner preset by the intermediate node. Certainly, the controller 201 may deliver the mapping relationship between the service label and the service processing manner to the intermediate node, and the intermediate node may identify the entropy label in the second packet according to the mapping relationship delivered by the controller. This is not limited in this embodiment.

In a specific implementation, for the service processing manner performed by the controller 201, the controller 201 may determine, based on the mapping relationship and according to the service label, that the second packet is corresponding to the service processing manner, and process the second packet in the service processing manner. Specifically, in the process of forwarding the second packet from the source node 202 to the destination node 203, the controller 201 may capture the second packet by using one or more forwarding nodes that the second packet passes through, to perform service processing on the second packet. Considering that the controller 201 is usually responsible for multiple service processing manners, in this case, the controller 201 needs to be capable of identifying a service processing manner represented by each service label. Therefore, when allocating the service label to the service processing manner, the controller 201 may save the mapping relationship between the service label and the service processing manner. When capturing the second packet, the controller 201 may determine, according to the saved mapping relationship, the service processing manner represented by the service label in the second packet, to process the second packet in the determined service processing manner.

In a specific implementation, for the service processing manner performed by the destination node 203, the destination node may determine, based on the service label in the mapping relationship, that the second packet is corresponding to the service processing manner, and process the second packet in the service processing manner. Considering that the destination node is usually responsible for multiple service processing manners, in this case, the destination node 203 needs to be capable of identifying a service processing manner represented by each service label. Therefore, the destination node may save the mapping relationship that is between the service label and the service processing manner and that is delivered by the controller 201 to the destination node 203. When receiving the second packet, the destination node 203 may determine, according to the mapping relationship, the service processing manner represented by the service label in the second packet, to process the second packet in the determined service processing manner, and may also identify the service label in the second packet, so as to pop the service label from the second packet, to obtain the first packet, so that the destination node 203 performs subsequent processing on the packet. For example, the obtained first packet continues to be forwarded along another forwarding path.

Figure 5:
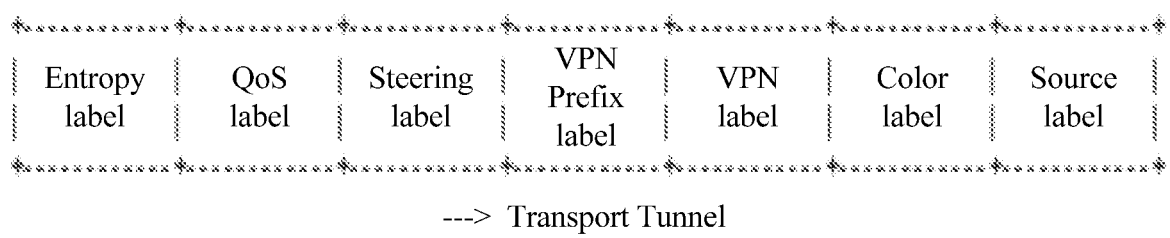
FIG. 5 is a schematic diagram of a packet label according to an embodiment of the present disclosure.

In a specific implementation, the network device may process a same packet in multiple different service processing manners. In this case, the controller 201 may allocate different service labels to different service processing manners of a same FEC, and may deliver multiple service labels corresponding to the same FEC to the source node 202 corresponding to the FEC. The source node 202 may insert the multiple service labels corresponding to the FEC to a packet corresponding to the FEC, so that a network device that is in a network and that needs to perform service processing on the packet processes the packet in the service processing manners. It can be seen that in a forwarding process of a packet, multiple service labels are inserted to a same packet, so that a combination of service processing manners can be flexibly selected for the packet. For example, in a packet label example shown in FIG. 5, an entropy label, a quality of service (QoS) label, a steering label, a VPN prefix label, a VPN label, a color label, and a source label are inserted to a packet.

When multiple service labels are inserted to a same packet, processing corresponding to these service processing manners may be performed by multiple different network devices. In this case, each network device may process the packet only in a service processing manner that the network device is responsible for. Certainly, in addition to processing the second packet in the service processing manner that the destination node 203 is responsible for, the destination node 203 further needs to pop all service labels from the second packet, to obtain the first packet, and perform normal processing on the first packet subsequently. For example, it is assumed that the source node 201 inserts a first service label, a second service label, and a third service label to the first packet, to obtain the second packet. The first service label represents a first service processing manner that the intermediate node is responsible for, the second service label represents a second service processing manner that the controller 201 is responsible for, and the third service label represents a third service processing manner of the destination node 203 is responsible for. In the process of forwarding the second packet from the source node 202 to the destination node 203, the intermediate node may identify the first service label in the second packet and process the second packet in the first service processing manner, the controller 201 may identify the second service label in the second packet and process the second packet in the second service processing manner, the destination node 203 may identify the third service label in the second packet and process the second packet in the third service processing manner, and the destination node 203 may identify all the three service labels in the second packet and pop the three service labels from the second packet, so that the first packet is obtained, and a forwarding process of the first packet is completed.

In a specific implementation, any mechanism such as an IP routing mechanism, an MPLS forwarding mechanism, or a segment routing mechanism may be used to forward a packet having a service label. When the MPLS forwarding mechanism or the segment routing mechanism is used, the packet is forwarded by using an LSP label. In this case, in a forwarding process of the packet, the LSP label of the packet and the service label may jointly form a label stack of the packet. Specifically, the controller 201 may be further configured to send a next-hop address corresponding to the FEC to the source node 202, so as to instruct the source node 202 to obtain an LSP label corresponding to the next-hop address and forward the second packet according to the LSP label. In the label stack of the second packet, the LSP label may be an outer label, and the service label may be an inner label. The next-hop address corresponding to the FEC represents an address of the destination node corresponding to the FEC.

According to the technical solution in this embodiment, in a network in which the forwarding node supports MPLS, the controller 201 allocates the service label to the service processing manner of the FEC, and establishes the mapping relationship between the service label and the service processing manner. On the one hand, the controller 201 sends the service label to the source node 202 corresponding to the FEC, so that the source node 202 may insert the service label to the packet corresponding to the FEC. On the other hand, the controller 201 may send the mapping relationship to the destination node 203 corresponding to the FEC, so that the destination node 203 may pop, according to the mapping relationship, the service label from the packet corresponding to the FEC. The service label is indication information that is used to identify the service processing manner, and is used for instructing, in the forwarding process of the packet, the network device that needs to perform service processing on the packet to process the packet in the service processing manner. It can be seen that the controller 201 allocates the service label, delivers the service label to the source node 202, and delivers the mapping relationship between the service label and the service processing manner to the destination node 203. For an FEC, the source node 202 corresponding to the FEC can insert, without static configuration, a service label corresponding to the FEC to a packet corresponding to the FEC, and the destination node 203 corresponding to the FEC can pop, without static configuration, the service label from the packet corresponding to the FEC, so that the packet corresponding to the FEC can have the service label corresponding to the FEC in a forwarding process, and service processing is performed on the packet by using the service label. Therefore, for each FEC in the network, only the controller 201 needs to be configured, so that service processing can be performed on a packet corresponding to each FEC, and the source node 202 and the destination node 203 corresponding to each FEC do not need to be statically configured. Therefore, a quantity of devices that need to be statically configured is reduced significantly, and work of configuring and maintaining service processing for a network environment is simplified. Further, because the work of configuring and maintaining service processing in the network is simplified, various service processing manners can be relatively easily and flexibly configured for each FEC, so that various service processing in the network environment can be flexibly implemented.

Figure 6:
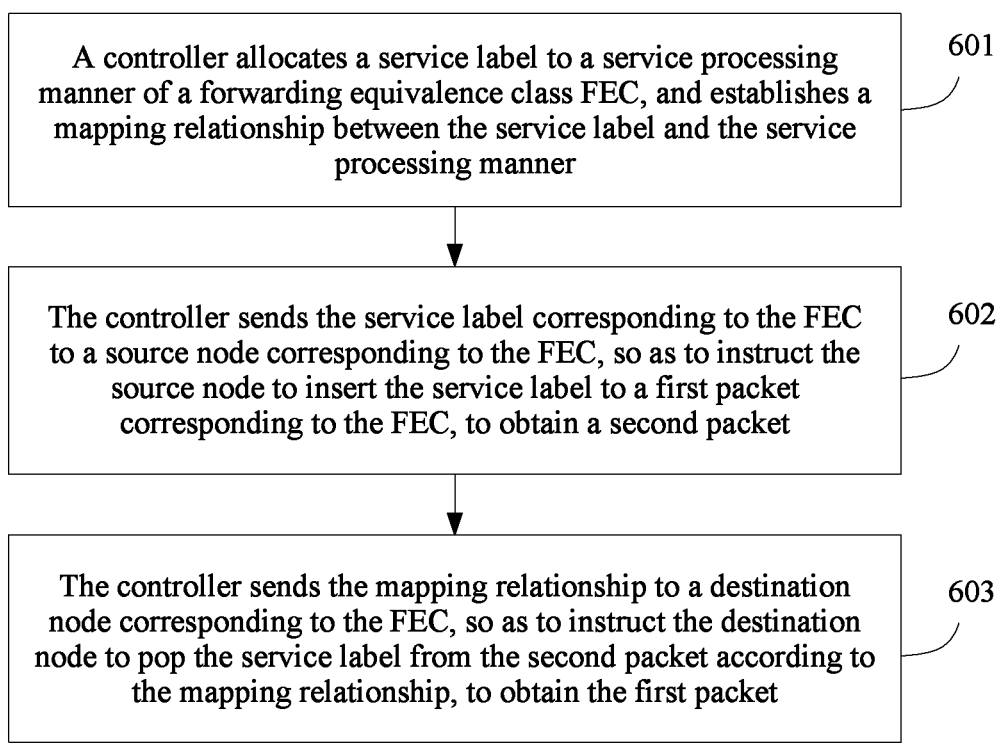
FIG. 6 is a schematic flowchart of a packet processing method according to an embodiment of the present disclosure.

Referring to FIG. 6, FIG. 6 is a schematic flowchart of a packet processing method according to an embodiment of the present disclosure. The method includes the following steps:

Step 601: A controller allocates a service label to a service processing manner of an FEC, and establishes a mapping relationship between the service label and the service processing manner.

Step 602: The controller sends the service label corresponding to the FEC to a source node corresponding to the FEC, so as to instruct the source node to insert the service label to a first packet corresponding to the FEC, to obtain a second packet.

Step 603: The controller sends the mapping relationship to a destination node corresponding to the FEC, so as to instruct the destination node to pop the service label from the second packet according to the mapping relationship, to obtain the first packet.

The service label is used for instructing, in a process of forwarding the second packet from the source node to the destination node, a network device that needs to perform service processing on the second packet to process the second packet in the service processing manner.

A sequence of performing step 602 and step 603 is not limited in this embodiment.

Optionally, step 602 may include:

binding, by the controller, the service label to routing information corresponding to the FEC, and sending, by the controller, the routing information bound with the service label to the source node, so as to instruct the source node to insert the service label to the first packet, to obtain the second packet.

Optionally, for example, step 603 may include:

inserting, by the controller, the service label and the service processing manner to network layer reachability information corresponding to the FEC, to form, in the network layer reachability information, the mapping relationship between the service label and the service processing manner, and sending, by the controller, the network layer reachability information to the destination node, so as to instruct the destination node to pop the service label from the second packet according to the mapping relationship, to obtain the first packet.

Optionally, this embodiment may further include: The controller determines, based on the mapping relationship and according to the service label, that the second packet is corresponding to the service processing manner, and the controller processes the second packet in the service processing manner. The service processing manner is not load sharing processing.

Optionally, this embodiment may further include: The controller sends a next-hop address corresponding to the FEC to the source node, so as to instruct the source node to obtain a label switched path (LSP) label corresponding to the next-hop address and forward the second packet according to the LSP label. In a label stack of the second packet, the LSP label is an outer label, and the service label is an inner label.

It should be noted that for the mapping relationship between the service label and the service processing manner and content of the service label in this embodiment of the present disclosure, refer to the embodiment shown in FIG. 2. In addition, for various specific implementations in which the controller performs the method steps in this embodiment of the present disclosure, refer to the detailed description of the embodiment shown in FIG. 2. Details are not described herein.

According to the technical solution in this embodiment, the controller allocates the service label, delivers the service label to the source node, and delivers the mapping relationship between the service label and the service processing manner to the destination node. For each FEC in a network, only the controller needs to be configured, so that service processing can be performed on a packet corresponding to each FEC, and a source node and a destination node corresponding to each FEC do not need to be statically configured. Therefore, a quantity of devices that need to be statically configured is reduced significantly, and work of configuring and maintaining service processing for a network environment is simplified.

Figure 7:
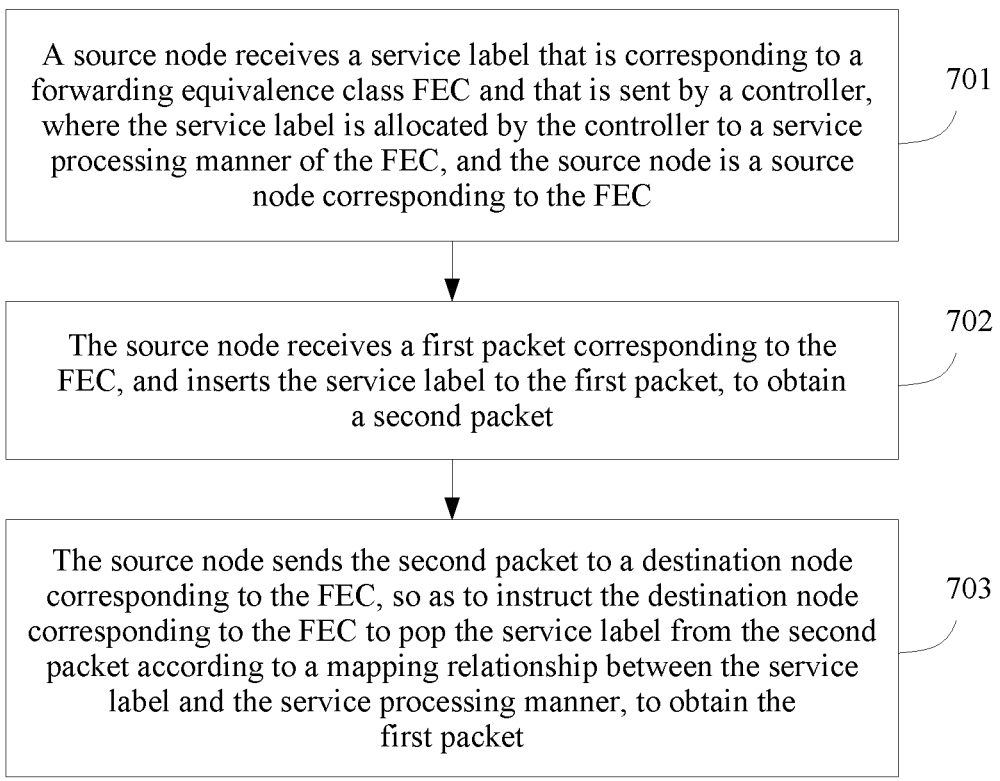
FIG. 7 is a schematic flowchart of another packet processing method according to an embodiment of the present disclosure.

Referring to FIG. 7, FIG. 7 is a schematic flowchart of another packet processing method according to an embodiment of the present disclosure. The method includes the following steps:

Step 701: A source node receives a service label that is corresponding to an FEC and that is sent by a controller, where the service label is allocated by the controller to a service processing manner of the FEC, and the source node is a source node corresponding to the FEC.

Step 702: The source node receives a first packet corresponding to the FEC, and inserts the service label to the first packet, to obtain a second packet.

Step 703: The source node sends the second packet to a destination node corresponding to the FEC, so as to instruct the destination node corresponding to the FEC to pop the service label from the second packet according to a mapping relationship between the service label and the service processing manner, to obtain the first packet, where the mapping relationship is established by the controller and sent to the destination node.

The service label is used for instructing, in a process of forwarding the second packet from the source node to the destination node, a network device that needs to perform service processing on the second packet to process the second packet in the service processing manner.

Optionally, step 701 may include: The source node receives routing information that is corresponding to the FEC and that is sent by the controller, and the source node obtains the service label bound to the routing information.

Optionally, this embodiment may further include: The source node receives a next-hop address that is corresponding to the FEC and that is sent by the controller, obtains a label switched path (LSP) label corresponding to the next-hop address, and uses the LSP label as an LSP label corresponding to the FEC. The second packet is forwarded according to the LSP label, and in a label stack of the second packet, the tunnel label is an outer label, and the service label is an inner label.

It should be noted that for the mapping relationship between the service label and the service processing manner and content of the service label in this embodiment of the present disclosure, refer to the embodiment shown in FIG. 2. In addition, for various specific implementations in which the source node performs the method steps in this embodiment of the present disclosure, refer to the detailed description of the embodiment shown in FIG. 2. Details are not described in this embodiment.

According to the technical solution in this embodiment, the source node receives the service label of the service processing manner corresponding to the FEC from the controller, and the service label is allocated by the controller to the service processing manner of the FEC. The source node inserts the service label to the packet corresponding to the FEC. Therefore, for each FEC in a network, service processing can be performed on a packet corresponding to each FEC without statically configuring a source node corresponding to each FEC. Therefore, a quantity of devices that need to be statically configured is reduced significantly, and work of configuring and maintaining service processing for a network environment is simplified.

Figure 8:
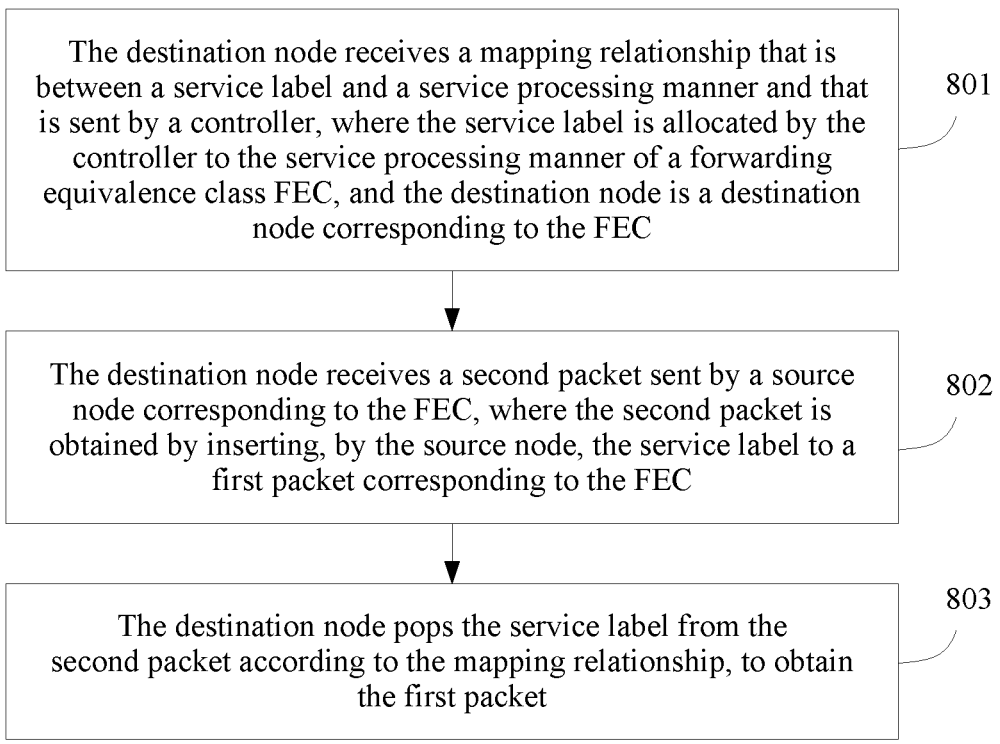
FIG. 8 is a schematic flowchart of still another packet processing method according to an embodiment of the present disclosure.

Referring to FIG. 8, FIG. 8 is a schematic flowchart of still another packet processing method according to an embodiment of the present disclosure. The method includes the following steps:

Step 801: A destination node receives a mapping relationship that is between a service label and a service processing manner and that is sent by a controller, where the service label is allocated by the controller to the service processing manner of an FEC, and the destination node is a destination node corresponding to the FEC.

Step 802: The destination node receives a second packet that is sent by a source node corresponding to the FEC, where the second packet is obtained by inserting, by the source node, the service label to a first packet corresponding to the FEC.

Step 803: The destination node pops the service label from the second packet according to the mapping relationship, to obtain the first packet.

The service label is used for instructing, in a process of forwarding the second packet from the source node to the destination node, a network device that needs to perform service processing on the second packet to process the second packet in the service processing manner.

Optionally, step 801 may include: The destination node receives network layer reachability information that is corresponding to the FEC and that is sent by the controller, and the destination node obtains the service label and the service processing manner from the network layer reachability information, to obtain the mapping relationship between the service label and the service processing manner.

Optionally, this embodiment may further include: The destination node determines, based on the mapping relationship and according to the service label, that the second packet is corresponding to the service processing manner, and the destination node processes the second packet in the service processing manner.

It should be noted that for the mapping relationship between the service label and the service processing manner and content of the service label in this embodiment of the present disclosure, refer to the embodiment shown in FIG. 2. In addition, for various specific implementations in which the destination node performs the method steps in this embodiment of the present disclosure, refer to the detailed description of the system embodiment shown in FIG. 2. Details are not described in this embodiment.

According to the technical solution in this embodiment, the destination node receives the mapping relationship that is between the service label and the service processing manner and that is sent by the controller, and the mapping relationship between the service label and the service label processing manner is pre-established by the controller. The destination node may pop, by using the mapping relationship, the service label from the packet corresponding to the FEC. For each FEC in a network, service processing can be performed on a packet corresponding to each FEC without statically configuring a destination node corresponding to each FEC. Therefore, a quantity of devices that need to be statically configured is reduced significantly, and work of configuring and maintaining service processing for a network environment is simplified.

To enable persons skilled in the art to more clearly understand a specific application manner of the present disclosure, the following describes the embodiments of the present disclosure by using an example of an application scenario. In the application scenario, any FEC in a network environment is used as a target FEC, and a controller delivers a next-hop address and a service label that are corresponding to the target FEC to a source node corresponding to the target FEC, and delivers a mapping relationship between a service label and a service processing manner to a destination node corresponding to the target FEC, so that forwarding processing and service processing can be performed, according to an LSP label corresponding to the next-hop address and the service label, on a packet corresponding to the target FEC. Service processing manners corresponding to the target FEC include a first service processing manner, a second service processing manner, and a third service processing manner. The controller is responsible for the first service processing manner, an intermediate node corresponding to the target FEC is responsible for the second service processing manner, and the destination node corresponding to the target FEC is responsible for the third service processing manner. It should be noted that the application scenario is merely an example of this embodiment of the present disclosure, and this embodiment of the present disclosure is not limited to the application scenario.

Figure 9:
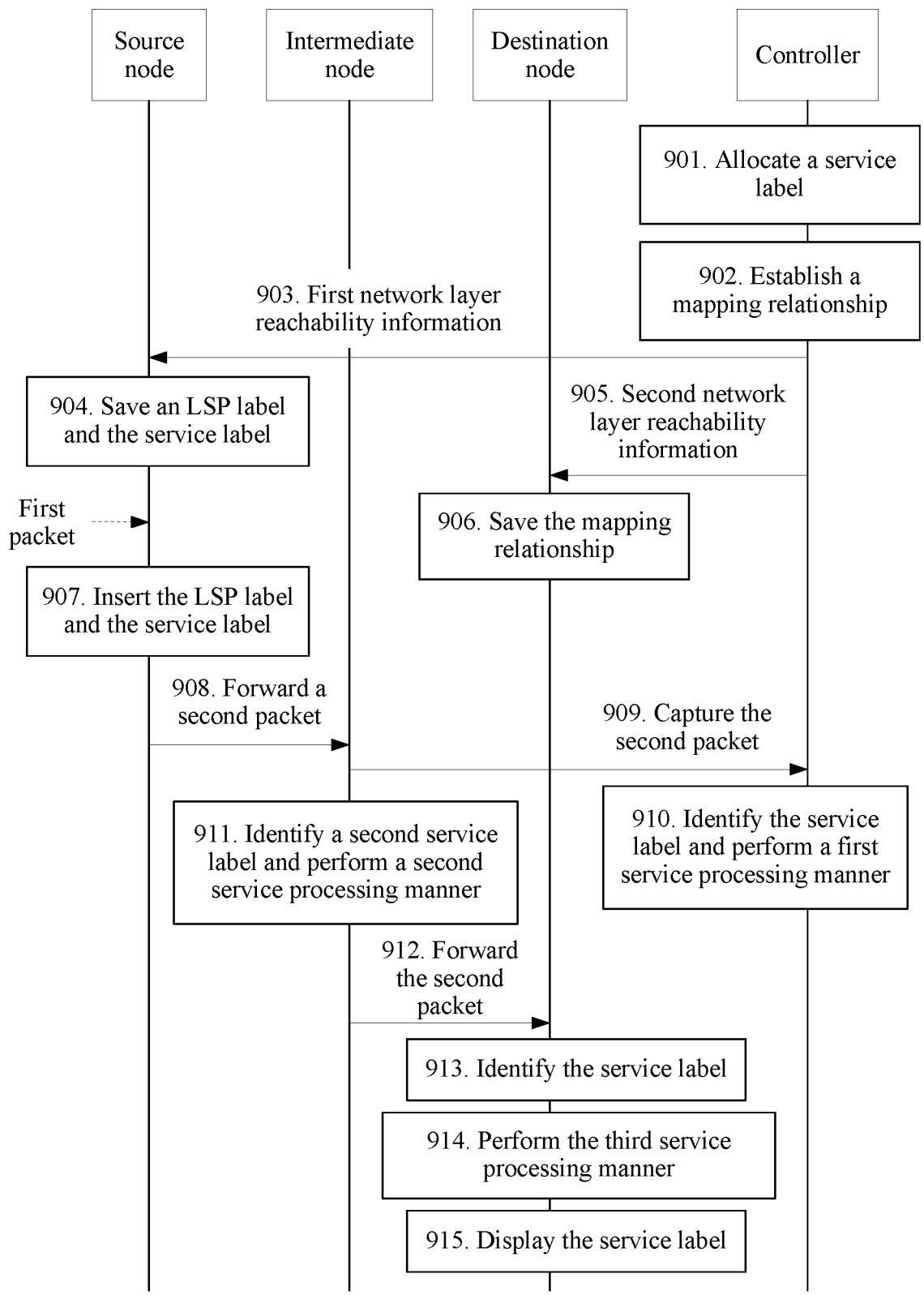
FIG. 9 is a schematic flowchart of yet another packet processing method according to an embodiment of the present disclosure.

Referring to FIG. 9, FIG. 9 is a schematic flowchart of yet another packet processing method according to an embodiment of the present disclosure. This embodiment of the present disclosure may be applied to the application scenario in the foregoing example, and the method includes the following steps.

Step 901: A controller allocates a service label to a service processing manner of a target FEC.

Specifically, the controller may allocate a first service label to a first service processing manner of the target FEC, may allocate a second service label to a second service processing manner of the target FEC, and may allocate a third service label to a third service processing manner of the target FEC.

Step 902: The controller establishes a mapping relationship between the service label and the service processing manner.

Specifically, the controller may establish a mapping relationship between the first service label and the first service processing manner as a first mapping relationship, may establish a mapping relationship between the second service label and the second service processing as a second mapping relationship, and may establish a mapping relationship between the third service label and the third service processing as a third mapping relationship.

Step 903: The controller generates, according to a next-hop address and the service label that are corresponding to the target FEC, first NLRI corresponding to the target FEC, and delivers the first NLRI to a source node corresponding to the target FEC.

Specifically, the next-hop address may be used as routing information corresponding to the target FEC, and inserted to an NLRI field of first network layer reachability information. The first service label, the second service label, and the third service label may be used as BGP attributes and bound to the first NLRI. The next-hop address is an address of a destination node corresponding to the target FEC.

Step 904: The source node searches for an LSP label according to the next-hop address, and saves both the LSP label and the service label in correspondence with the target FEC.

Labels saved by the source node in correspondence with the target FEC include the LSP label, the first service label, the second service label, and the third service label.

Step 905: The controller generates second NLRI according to the mapping relationship between the service label and the service processing manner, and delivers the second NLRI to a destination node corresponding to the target FEC.

Specifically, the controller may generate three pieces of second NLRI that are corresponding to the foregoing three mapping relationships, and deliver all the three pieces of second NLRI to the destination node. In one piece of second NLRI, the first service label is inserted to an SID/Label/Index field, and the first service processing manner is inserted to a type specific value field. In another piece of second NLRI, the second service label is inserted to an SID/Label/Index field, and the second service processing manner is inserted to a type specific value field. In still another piece of second NLRI, the third service label is inserted to an SID/Label/Index field, and the third service processing manner is inserted to a type specific value field.

Step 906: The destination node saves the received mapping relationship.

Mapping relationships saved by the destination node include the first mapping relationship, the second mapping relationship, and the third mapping relationship.

Step 907: When receiving a first packet corresponding to the target FEC, the source node inserts the LSP label and the service label to the first packet, to obtain a second packet.

Specifically, a label stack of the second packet includes the LSP label, the first service label, the second service label, and the third service label. The LSP label is an outer label, and the first service label, the second service label, and the third service label are inner labels.

Step 908: The source node forwards the second packet according to the LSP label.

Step 909: When an intermediate node receives the second packet, the controller captures the second packet by using the intermediate node.

The intermediate node may be any intermediate node on a forwarding path of the second packet.

In addition, when the intermediate node receives the second packet, the intermediate node may send the second packet to the controller in response to the capturing performed by the controller, that is, perform step 909. Further, the intermediate node may identify the service label in the second packet and perform service processing on the second packet, that is, perform subsequent step 911.

Step 910: The controller identifies the service label in the second packet according to the mapping relationship, and processes the second packet in a first service processing manner in response to identification of a first service label.

The controller may identify the first service label in the second packet according to the pre-established first mapping relationship, and determine that the first service label represents the first service processing manner, so as to process the second packet in the first service processing manner.

It should be understood that, in addition to the first service label, the controller may further identify the second service label and the third service label in the second packet according to the pre-established second mapping relationship and third mapping relationship. However, neither the second service processing manner represented by the second service label nor the service processing manner represented by the third service label needs to be performed by the controller. Therefore, the controller may not need to perform actions in response to instructions of the second service label and the third service label.

Step 911: When the intermediate node receives the second packet, the intermediate node identifies a second service label in the second packet according to fixed configuration, and processes the second packet in a second service processing manner represented by the second service label.

Specifically, the second service processing manner is load sharing processing, and the second service label is an entropy label. The intermediate node may find the entropy label from the second packet according to the fixed configuration, and then, the intermediate node may process the entropy label and perform load sharing processing on the second packet according to a processing result of the entropy label.

Step 912: The intermediate node forwards the second packet according to the LSP label.

Step 913: The destination node receives the second packet, and identifies the service label in the second packet according to the mapping relationship.

Specifically, the destination node may identify the first service label, the second service label, and the third service label from the second packet according to the pre-stored first mapping relationship, second mapping relationship, and third mapping relationship.

Step 914: The destination node processes the second packet in a third service processing manner.

Specifically, the destination node may determine, according to the pre-established third mapping relationship, that the third service label represents the third service processing manner, so as to process the second packet in the third service processing manner.

Step 915: The destination node pops the service label from the second packet, to obtain the first packet.

Specifically, the destination node pops all service labels in the second packet from the second packet, that is, the destination node pops the first service label, the second service label, and the third service label in the second packet from the second packet.

According to the technical solution in this embodiment, for each FEC in a network environment, only the controller needs to be configured, so that service processing can be performed on a packet corresponding to each FEC, and a source node and a destination node corresponding to each FEC do not need to be statically configured. Therefore, a quantity of devices that need to be statically configured is reduced significantly, and work of configuring and maintaining service processing for the network environment is simplified. Further, because the work of configuring and maintaining service processing in the network environment is extremely easy, various service processing manners can be relatively easily and flexibly configured for each FEC, so that various service processing in the network environment can be flexibly implemented.

Figure 10:
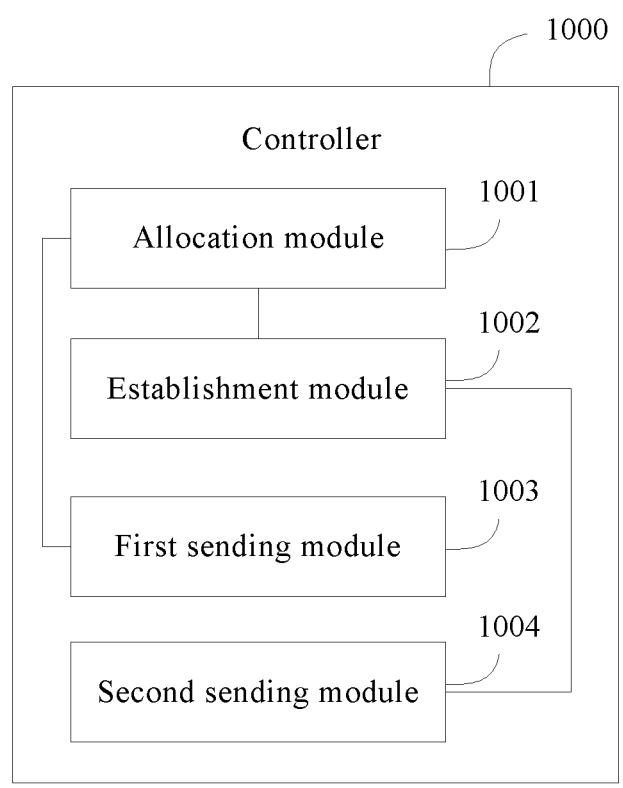
FIG. 10 is a schematic structural diagram of a packet processing controller according to an embodiment of the present disclosure.

Referring to FIG. 10, FIG. 10 is a schematic structural diagram of a controller 100 according to an embodiment of the present disclosure. The controller 1000 includes:

an allocation module 1001, configured to allocate a service label to a service processing manner of an FEC;

an establishment module 1002, configured to establish a mapping relationship between the service label and the service processing manner;

a first sending module 1003, configured to send the service label corresponding to the FEC to a source node corresponding to the FEC, so as to instruct the source node to insert the service label to a first packet corresponding to the FEC, to obtain a second packet; and a second sending module 1004, configured to send the mapping relationship to a destination node corresponding to the FEC, so as to instruct the destination node to pop the service label from the second packet according to the mapping relationship, to obtain the first packet.

The service label is used for instructing, in a process of forwarding the second packet from the source node to the destination node, a network device that needs to perform service processing on the second packet to process the second packet in the service processing manner.

During specific implementation, in the controller 1000, for the service processing manner of the FEC, the allocation module 1001 may allocate the service label to the service processing manner of the FEC, the establishment module 1002 may establish the mapping relationship between the service label that is allocated by the allocation module 1001 and the service processing manner, the first sending module 1003 may deliver, to the source node, the service label that is allocated by the allocation module 1001, and the second sending module 1004 may deliver the mapping relationship established by the establishment module 1002 to the destination node.

Optionally, the first sending module 1003 may include a binding submodule and a first sending submodule. The binding submodule is configured to bind the service label to routing information corresponding to the FEC. The first sending submodule is configured to send the routing information bound with the service label to the source node, so as to instruct the source node to insert the service label to the first packet, to obtain the second packet.

Optionally, the second sending module 1004 may include an insertion submodule and a second sending submodule. The insertion submodule is configured to insert the service label and the service processing manner to network layer reachability information corresponding to the FEC, to form, in the network layer reachability information, the mapping relationship between the service label and the service processing manner. The second sending submodule is configured to send the network layer reachability information to the destination node, so as to instruct the destination node to pop the service label from the second packet according to the mapping relationship, to obtain the first packet.

Optionally, the controller 1000 may further include a determining module and a service processing module. The determining module is configured to determine, based on the mapping relationship and according to the service label, that the second packet is corresponding to the service processing manner. The service processing module is configured to process the second packet in the service processing manner.

Optionally, the controller 1000 may further include a third sending module, configured to send a next-hop address corresponding to the FEC to the source node, so as to instruct the source node to obtain a label switched path (LSP) label corresponding to the next-hop address and forward the second packet according to the LSP label. In a label stack of the second packet, the LSP label is an outer label, and the service label is an inner label.

It should be noted that the controller 1000 in this embodiment is corresponding to the controller 201 in the embodiment shown in FIG. 2. For various specific implementations of the controller 1000 in this embodiment, refer to the detailed description of the embodiment shown in FIG. 2. Details are not described in this embodiment.

According to the technical solution in this embodiment, the controller 1000 allocates the service label, delivers the service label to the source node, and delivers the mapping relationship between the service label and the service processing manner to the destination node. For each FEC in a network, only the controller 1000 needs to be configured, so that service processing can be performed on a packet corresponding to each FEC, and a source node and a destination node corresponding to each FEC do not need to be statically configured. Therefore, a quantity of devices that need to be statically configured is reduced significantly, and work of configuring and maintaining service processing for a network environment is simplified.

Figure 11:
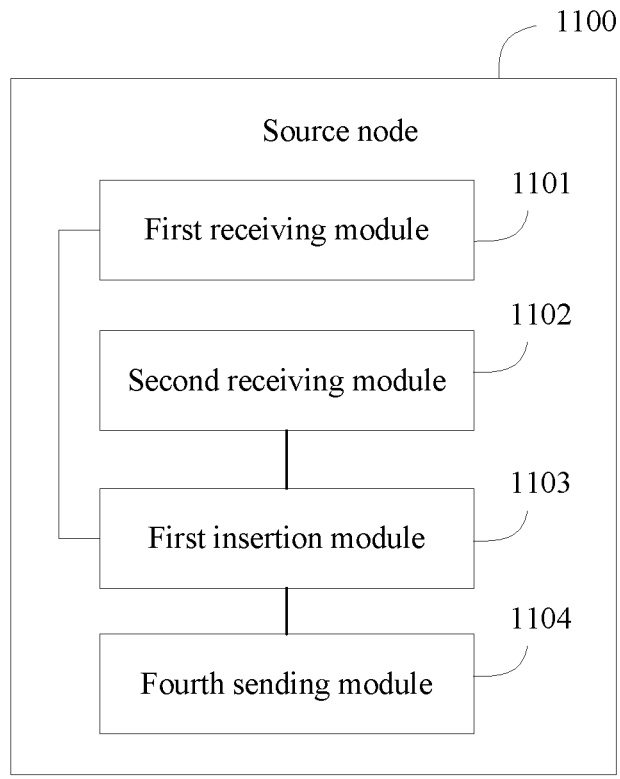
FIG. 11 is a schematic structural diagram of a source node device for packet processing according to an embodiment of the present disclosure.

Referring to FIG. 11, FIG. 11 is a schematic structural diagram of a source node device 1100 according to an embodiment of the present disclosure. The source node device 1100 includes:
- a first receiving module 1101, configured to receive a service label that is corresponding to an FEC and that is sent by a controller, where the service label is allocated by the controller to service processing manner of the FEC, and the source node is a source node corresponding to the FEC;
- a second receiving module 1102, configured to receive a first packet corresponding to the FEC;
- an insertion module 1103, configured to insert the service label to the first packet, to obtain a second packet; and
- a first sending module 1104, configured to send the second packet to a destination node corresponding to the FEC, so as to instruct the destination node corresponding to the FEC to pop the service label from the second packet according to a mapping relationship between the service label and the service processing manner, to obtain the first packet, where the mapping relationship is established by the controller and sent to the destination node.

The service label is used for instructing, in a process of forwarding the second packet from the source node 1100 to the destination node, a network device that needs to perform service processing on the second packet to process the second packet in the service processing manner.

During specific implementation, in the source node device 1100, the first receiving module 1101 may receive the service label corresponding to the FEC from the controller, the second receiving module 1102 may receive the first packet corresponding to the FEC, the first insertion module 1103 may insert the service label that is received by the first receiving module 1101 to the first packet that is received by the second receiving module 1102, to obtain the second packet, and the first sending module 1104 may send the second packet that is obtained by the insertion module 1103 to the destination node corresponding to the FEC.

Optionally, the first receiving module 1101, for example, may include a first receiving submodule and a first obtaining submodule. The first receiving submodule is configured to receive routing information that is corresponding to the FEC and that is sent by the controller. The first obtaining submodule is configured to obtain the service label bounded to the routing information.

Optionally, the source node device 1100 may further include: a third receiving module, configured to receive a next-hop address that is corresponding to the FEC and that is sent by the controller; and an obtaining module, configured to: obtain a label switched path (LSP) label corresponding to the next-hop address, and use the LSP label as an LSP label corresponding to the FEC. The second packet is forwarded according to the LSP label, and in a label stack of the second packet, the LSP label is an outer label, and the service label is an inner label.

It should be noted that the source node device 1100 in this embodiment is corresponding to the source node 202 in the embodiment shown in FIG. 2. For various specific implementations of the source node device 1100 in this embodiment, refer to the detailed description of the embodiment shown in FIG. 2. Details are not described in this embodiment.

According to the technical solution in this embodiment, the source node device 1100 may receive the service label by using the controller, to insert the service label to the packet. For each FEC in a network, service processing can be performed on a packet corresponding to each FEC without statically configuring the source node device 1100 corresponding to each FEC. Therefore, a quantity of devices that need to be statically configured is reduced significantly, and work of configuring and maintaining service processing for a network environment is simplified.

Figure 12:
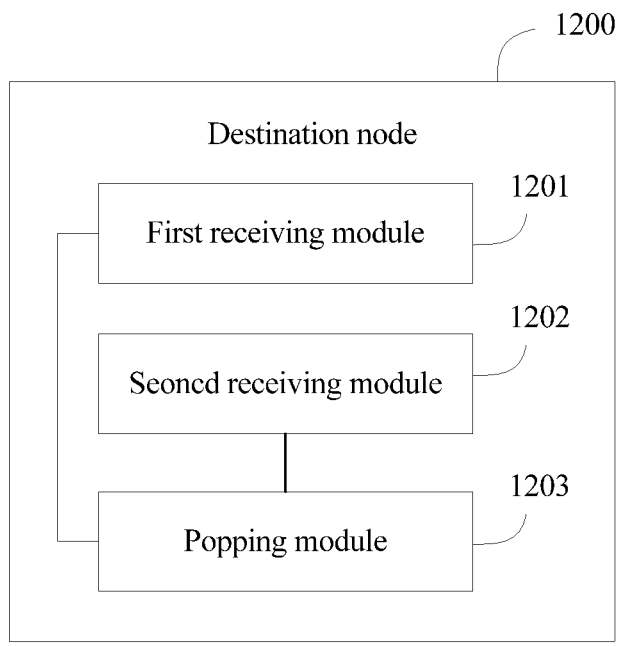
FIG. 12 is a schematic structural diagram of a destination node device for packet processing according to an embodiment of the present disclosure.

Referring to FIG. 12, FIG. 12 is a schematic structural diagram of a destination node device 1200 according to the present disclosure. The device 1200 includes:
- a first receiving module 1201, configured to receive a mapping relationship that is between a service label and a service processing manner and that is sent by a controller, where the service label is allocated by the controller to the service processing manner of a forwarding equivalence class FEC, and the destination node is a destination node corresponding to the FEC;
- a second receiving module 1202, configured to receive a second packet that is sent by a source node corresponding to the FEC, where the second packet is obtained by inserting, by the source node, the service label to a first packet corresponding to the FEC; and a popping module 1203, configured to pop the service label from the second packet according to the mapping relationship, to obtain the first packet.

The service label is used for instructing, in a process of forwarding the second packet from the source node to the destination node, a network device that needs to perform service processing on the second packet to process the second packet in the service processing manner.

During specific implementation, in the destination node device 1200, the first receiving module 1201 may receive the mapping relationship between the service label and the service processing manner from the controller, the second receiving module 1202 may receive the second packet to which the service label is inserted, and the popping module 1203 may identify, according to the mapping relationship received by the first receiving module 1201, the service label from the second packet that is received by the second receiving module 1202, and pop the service label from the second packet.

Optionally, the first receiving module 1201 may include a second receiving submodule and a second obtaining submodule. The second receiving submodule is configured to receive network layer reachability information that is corresponding to the FEC and that is sent by the controller. The second obtaining submodule is configured to obtain the service label and the service processing manner from the network layer reachability information, to obtain the mapping relationship between the service label and the service processing manner.

Optionally, the destination node device 1200 may further include a determining module and a service processing module. The determining module is configured to determine, based on the mapping relationship and according to the service label, that the second packet is corresponding to the service processing manner. The service processing module is configured to process the second packet in the service processing manner.

It should be noted that the destination node device 1200 in this embodiment is corresponding to the destination node 203 in the embodiment shown in FIG. 2. For various specific implementations of the destination node device 1200 in this embodiment, refer to the detailed description of the embodiment shown in FIG. 2. Details are not described in this embodiment.

According to the technical solution in this embodiment, the destination node device 1200 may receive the mapping relationship between the service label and the service processing manner from the controller, to pop the service label from the packet. For each FEC in a network, service processing can be performed on a packet corresponding to each FEC without statically configuring the destination node device 1200 corresponding to each FEC. Therefore, a quantity of devices that need to be statically configured is reduced significantly, and work of configuring and maintaining service processing for a network environment is simplified.

Figure 13:
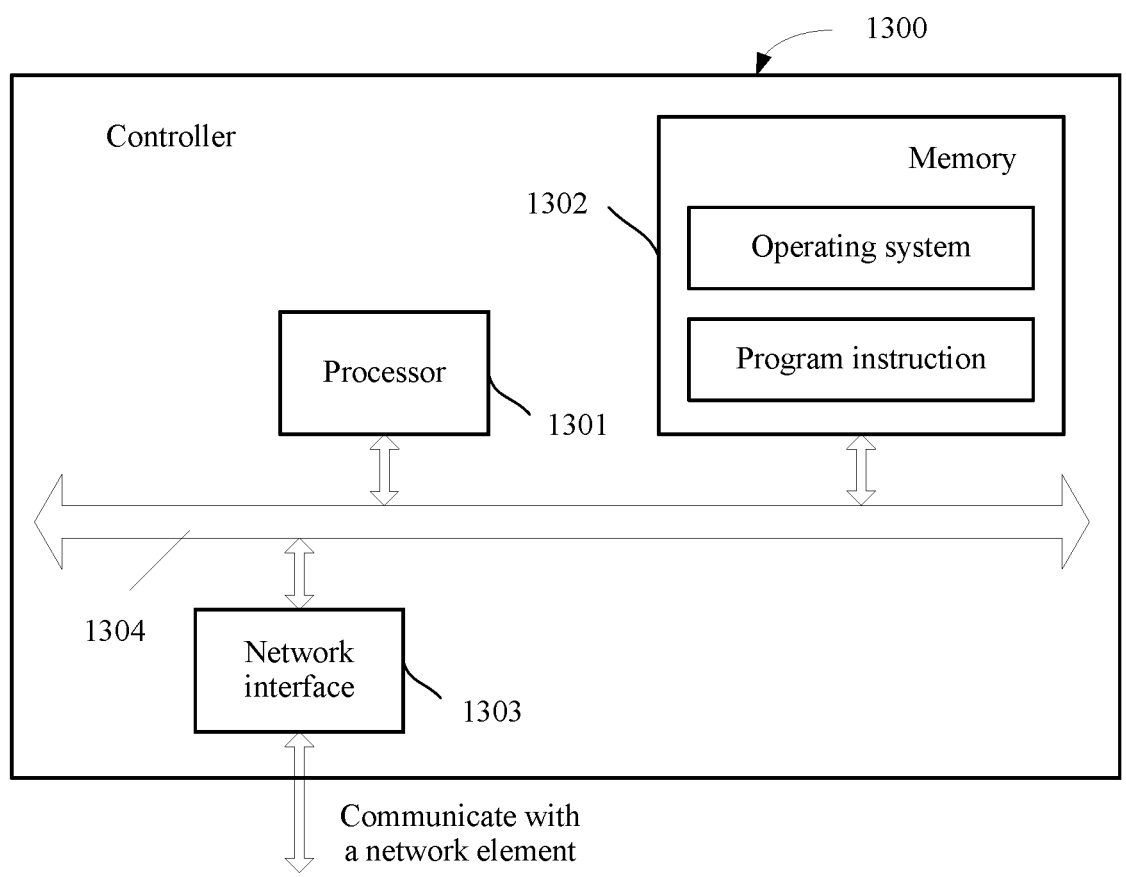
FIG. 13 is a schematic structural diagram of a controller according to an embodiment of the present disclosure.

Referring to FIG. 13, FIG. 13 is a schematic structural diagram of a controller according to an embodiment of the present disclosure. In this embodiment, a controller 1300 includes a processor 1301, a memory 1302, a network interface 1303, and a bus system 1304.

The bus system 1304 is configured to couple all hardware components of the controller 1300.

The network interface 1303 is configured to implement a communication connection between the controller 1300 and at least one other network element by using the Internet, a wide area network, a local network, a metropolitan area network, or the like.

The memory 1302 is configured to store a program instruction and data.

The processor 1301 is configured to read the instruction and the data that are stored in the memory 1302, so as to perform the following operations:

The processor 1301 allocates a service label to a service processing manner of a forwarding equivalence class FEC, and establishes a mapping relationship between the service label and the service processing manner;

the processor 1301 sends the service label corresponding to the FEC to a source node corresponding to the FEC, so as to instruct the source node to insert the service label to a first packet corresponding to the FEC, to obtain a second packet; and the processor 1301 sends the mapping relationship to a destination node corresponding to the FEC, so as to instruct the destination node to pop the service label from the second packet according to the mapping relationship, to obtain the first packet.

The service label is used for instructing, in a process of forwarding the second packet from the source node to the destination node, a network device that needs to perform service processing on the second packet to process the second packet in the service processing manner.

Optionally, to send the service label corresponding to the FEC to the source node corresponding to the FEC, so as to instruct the source node to insert the service label to the first packet corresponding to the FEC, to obtain the second packet, for example, the processor 1301 may perform the following operations:

The processor 1301 binds the service label to routing information corresponding to the FEC; and the processor 1301 sends the routing information bound with the service label to the source node, so as to instruct the source node to insert the service label to the first packet, to obtain the second packet.

Optionally, to send the mapping relationship to the destination node corresponding to the FEC, so as to instruct the destination node to pop the service label from the second packet according to the mapping relationship, to obtain the first packet, for example, the processor 1301 may perform the following operations:

The processor 1301 inserts the service label and the service processing manner to network layer reachability information corresponding to the FEC, to form, in the network layer reachability information, the mapping relationship between the service label and the service processing manner; and the processor 1301 sends the network layer reachability information to the destination node, so as to instruct the destination node to pop the service label from the second packet according to the mapping relationship, to obtain the first packet.

Optionally, for example, the processor 1301 may further perform the following operations:

The processor 1301 determines, based on the mapping relationship and according to the service label, that the second packet is corresponding to the service processing manner; and the processor 1301 processes the second packet in the service processing manner.

The service processing is not to perform load sharing processing on the packet, and the network device is the controller.

Optionally, for example, the processor 1301 may further perform the following operation:

The processor 1301 sends a label switched path (LSP) label corresponding to the FEC to the source node, so as to instruct the source node to forward the second packet according to the LSP label.

In a label stack of the second packet, the LSP label is an outer label, and the service label is an inner label.

It should be noted that the controller 1300 in this embodiment is corresponding to the controller 201 in the embodiment shown in FIG. 2. For various specific implementations of the controller 1300 in this embodiment, refer to the detailed description of the embodiment shown in FIG. 2. Details are not described in this embodiment.

Figure 14:
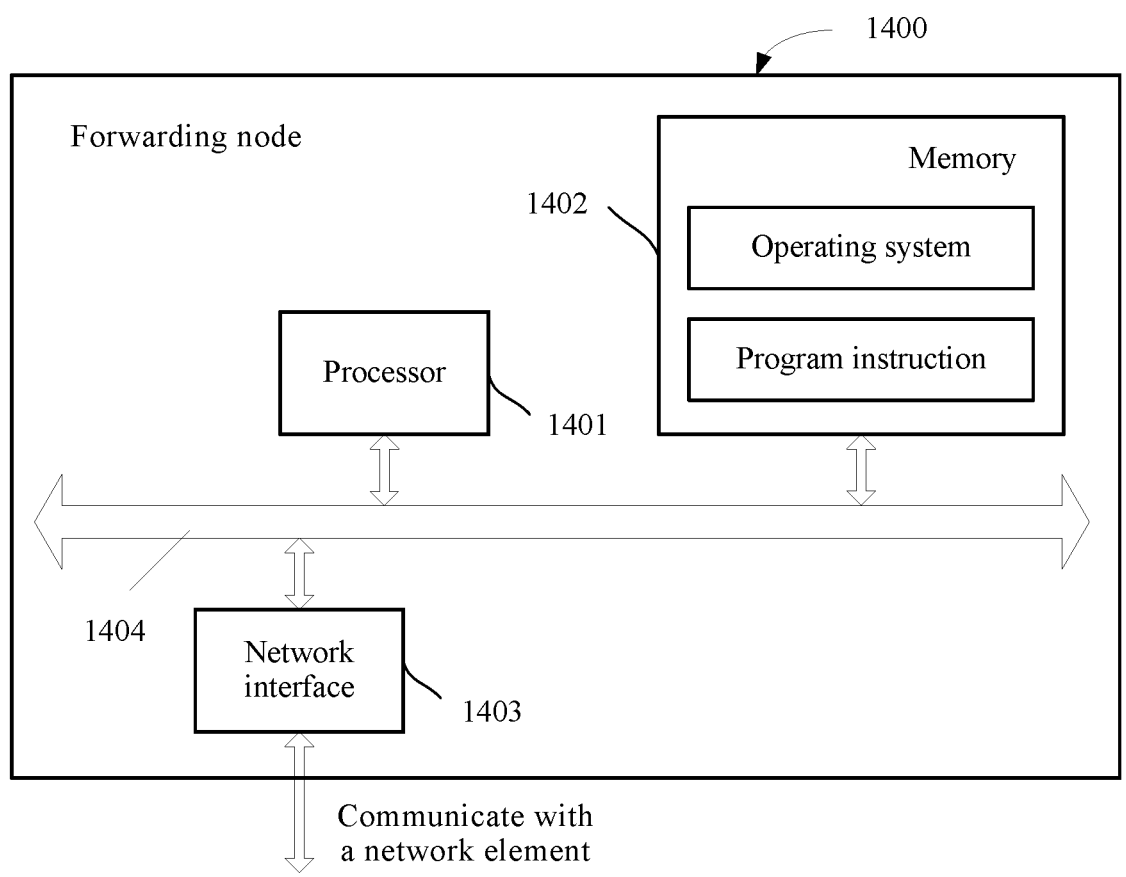
FIG. 14 is a schematic structural diagram of a source node device according to an embodiment of the present disclosure.

Referring to FIG. 14, FIG. 14 is a schematic structural diagram of a source node device 1400 according to an embodiment of the present disclosure. For example, the source node device 1400 in this embodiment may include a processor 1401, a memory 1402, a network interface 1403, and a bus system 1404.

The bus system 1404 is configured to couple all hardware components of the source node device 1400.

The network interface 1403 is configured to implement a communication connection between the forwarding node 1400 and at least one other network element by using the Internet, a wide area network, a local network, a metropolitan area network, or the like.

The memory 1402 is configured to store a program instruction and data.

The processor 1401 is configured to read the instruction and the data that are stored in the memory 1402, so as to perform the following operations:

The processor 1401 receives a service label that is corresponding to a forwarding equivalence class FEC and that is sent by a controller, where the service label is allocated by the controller to a service processing manner of the FEC, and the source node device 1400 is a source node corresponding to the FEC;

the processor 1401 receives a first packet corresponding to the FEC, and inserts the service label to the first packet, to obtain a second packet; and the processor 1401 sends the second packet to a destination node corresponding to the FEC, so as to instruct the destination node corresponding to the FEC to pop the service label from the second packet according to a mapping relationship between the service label and the service processing manner, to obtain the first packet, where the mapping relationship is established by the controller and sent to the destination node.

The service label is used for instructing, in a process of forwarding the second packet from the source node to the destination node, a network device that needs to perform service processing on the second packet to process the second packet in the service processing manner.

Optionally, to receive the service label that is corresponding to the FEC and that is sent by the controller, for example, the processor 1401 may perform the following operations:

The processor 1401 receives routing information that is corresponding to the FEC and that is sent by the controller; and the processor 1401 obtains the service label bound to the routing information.

Optionally, for example, the processor 1401 may further perform the following operation:

The processor 1401 receives a label switched path (LSP) label that is corresponding to the FEC and that is sent by the controller.

The second packet is forwarded according to the LSP label.

In a label stack of the second packet, the tunnel label is an outer label, and the service label is an inner label.

It should be noted that the source node device 1400 in this embodiment is corresponding to the source node 202 in the embodiment shown in FIG. 2. For various specific implementations of the source node device 1400 in this embodiment, refer to the detailed description of the embodiment shown in FIG. 2. Details are not described in this embodiment.

Figure 15:
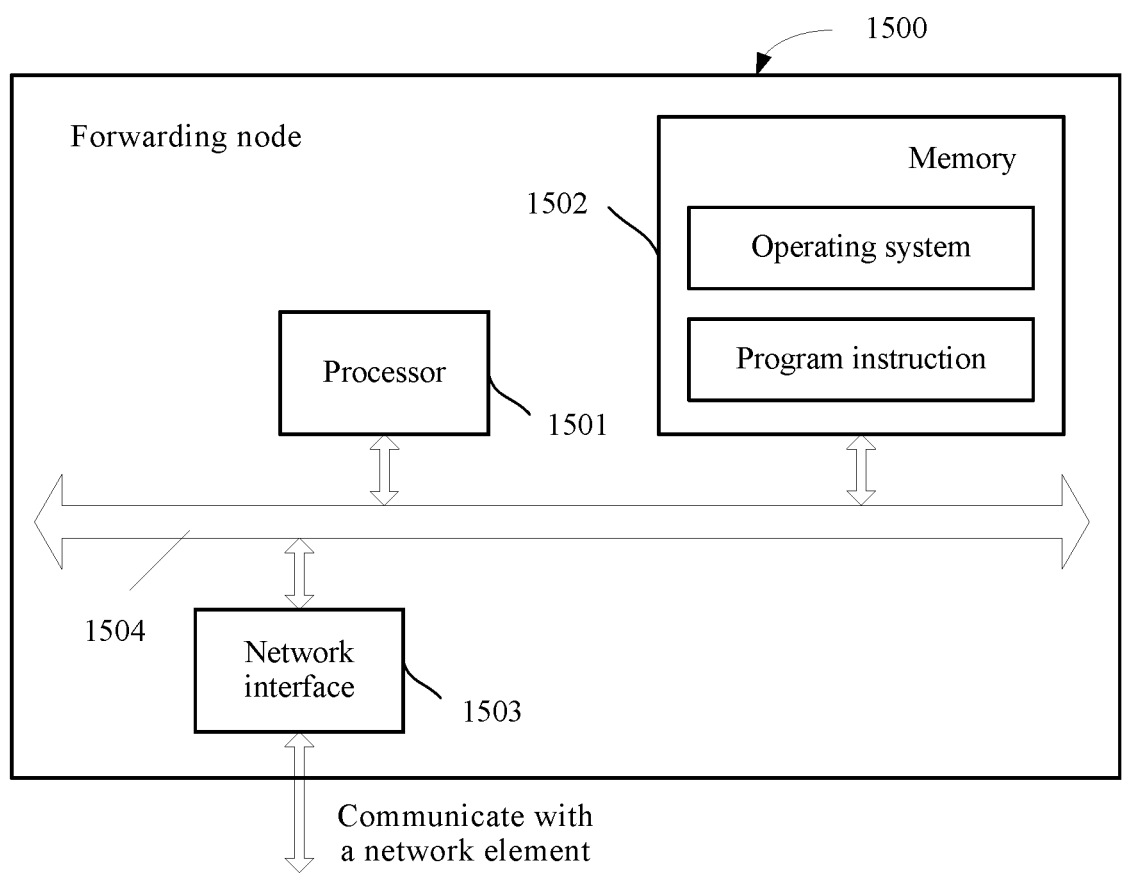
FIG. 15 is a schematic structural diagram of a destination node device according to an embodiment of the present disclosure.

Referring to FIG. 15, an embodiment of the present disclosure provides a schematic structural diagram of a destination node device 1500. For example, the destination node device 1500 in this embodiment may include a processor 1501, a memory 1502, a network interface 1503, and a bus system 1504.

The bus system 1504 is configured to couple all hardware components of the destination node device 1500.

The network interface 1503 is configured to implement a communication connection between the destination node device 1500 and at least one other network element by using the Internet, a wide area network, a local network, a metropolitan area network, or the like.

The memory 1502 is configured to store a program instruction and data.

The processor 1501 is configured to read the instruction and the data that are stored in the memory 1502, so as to perform the following operations:

The processor 1501 receives a mapping relationship that is between a service label and a service processing manner and that is sent by a controller, where the service label is allocated by the controller to the service processing manner of a forwarding equivalence class FEC, and the destination node device 1500 is a destination node corresponding to the FEC;

the processor 1501 receives a second packet that is sent by a source node corresponding to the FEC, where the second packet is obtained by inserting, by the source node, the service label to a first packet corresponding to the FEC; and the processor 1501 pops the service label from the second packet according to the mapping relationship, to obtain the first packet.

The service label is used for instructing, in a process of forwarding the second packet from the source node to the destination node, a network device that needs to perform service processing on the second packet to process the second packet in the service processing manner.

Optionally, to receive the mapping relationship between the service label and the service processing manner, for example, the processor 1501 may perform the following operations:

The processor 1501 receives network layer reachability information that is corresponding to the FEC and that is sent by the controller; and the processor 1501 obtains the service label and the service processing manner from the network layer reachability information, to obtain the mapping relationship between the service label and the service processing manner.

Optionally, for example, the processor 1501 may further perform the following operations:

The processor 1501 determines, based on the mapping relationship and according to the service label, that the second packet is corresponding to the service processing manner; and the processor 1501 processes the second packet in the service processing manner.

The service processing manner is not to perform load sharing processing on the packet, and the network device is the destination node.

It should be noted that the destination node device 1500 in this embodiment is corresponding to the destination node 203 in the embodiment shown in FIG. 2. For various specific implementations of the destination node device 1500 in this embodiment, refer to the detailed description of the embodiment shown in FIG. 2. Details are not described in this embodiment.

The word "first" in a first packet and a first sending module that are mentioned in the embodiments of the present disclosure is merely used as a name identifier, and does not mean being the first in a sequence. This rule is also applicable to the word "second", "third", and "fourth".

It should be noted that the processor in the embodiments of the present disclosure may be an integrated circuit chip, and has a signal processing capability. In an implementation process, steps in the foregoing methods can be implemented by using a hardware integrated logical circuit in the processor, or by using instructions in a form of software. These instructions may be implemented and controlled by cooperation of the processor, and are used to execute the methods disclosed in the embodiments of the present disclosure. The processor may also be a general purpose processor, a digital signal processor (DSP), an application-specific integrated circuit (application specific integrated circuit), a field programmable gate array (FPGA) or another programmable logical device, a discrete gate or a transistor logical device, or discrete hardware component.

The general purpose processor may be a microprocessor or the processor may be any conventional processor, decoder, or the like. The steps of the method disclosed with reference to the embodiments of the present disclosure may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like.

The bus system may further include a power bus, a control bus, a status signal bus, and the like in addition to a data bus. However, for clear description, various types of buses in FIG. 13, 14 and FIG. 15 are marked as the bus system.

From the foregoing descriptions of the implementations, persons skilled in the art may clearly understand that some or all steps of the methods in the embodiments may be implemented by software in addition to a universal hardware platform. Based on such an understanding, the technical solutions of the present disclosure essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network device such as media gateway) to perform the methods described in the embodiments or some parts of the embodiments of the present disclosure.

It should be noted that the embodiments in this specification are all described in a progressive manner, for same or similar parts in the embodiments, reference may be made to these embodiments, and each embodiment focuses on a difference from other embodiments. Especially, method and apparatus embodiments are basically similar to a system embodiment, and therefore are described briefly. For related parts, refer to partial descriptions in the system embodiment. The described device and system embodiments are merely examples. The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments. Persons of ordinary skill in the art may understand and implement the embodiments of the present disclosure without creative efforts.

The foregoing descriptions are merely implementations of the present disclosure, but are not intended to limit the protection scope of the present disclosure. It should be noted that persons of ordinary skill in the art may make certain improvements and polishing without departing from the principle of this application and the improvements and polishing shall fall within the protection scope of this application.

What is claimed is:

1. A method for processing packets, comprising:
    allocating, by a controller, a service label corresponding to a service processing manner of a forwarding equivalence class (FEC) and a path, wherein the controller also establishes a mapping relationship between the service label and the service processing manner;
    sending, by the controller, the service label to a source node of the path to enable the source node to insert the service label to a first packet to obtain a second packet to be forwarded along the path to a destination node, wherein the service label is used to instruct a network node on the path to perform service processing on the second packet according to the service processing manner; and
    sending, by the controller, the mapping relationship to the destination node to enable the destination node to pop the service label from the second packet to obtain the first packet.

2. The method according to claim 1, further comprising:
    binding, by the controller, the service label to routing information corresponding to the path; and
    sending, by the controller, the routing information bound with the service label to the source node.

3. The method according to claim 1, further comprising:
    sending, by the controller, the service label to the destination node of the path to enable the destination node to perform service processing according to the service label.

4. The method according to claim 1, wherein the service label comprises a source label, segment identifier (SID), an entropy label, a quality of service (QoS) label, a steering label, a virtual private network (VPN) prefix label, a VPN label, or a color label.

5. The method according to claim 1, wherein the service label is a bottom label in a label stack of the second packet.

6. The method according to claim 1, wherein the path is a segment routing (SR) path.

7. The method according to claim 1, wherein the service processing manner comprises:
    performing load sharing processing on a packet;
    performing source identification processing on a packet; or
    performing packet coloring processing.

8. The method according to claim 1, wherein the path comprises the network node and the destination node.

9. A method for processing packet, comprising:
receiving, by a source node of a path, a service label corresponding to a service processing manner of a forwarding equivalence class (FEC) and the path;
receiving, by a destination node of the path, a mapping relationship between the service label and the service processing manner;
receiving, by the source node, a first packet;
inserting the service label to the first packet to generate a second packet; and
sending, by the source node, the second packet to the destination node corresponding to the path, wherein the service label is used to instruct a network node on the path to perform service processing on the second packet according to the service processing manner; and
receiving the second packet at the destination node, wherein the destination node is enabled, based on the mapping relationship, to pop the service label from the second packet to obtain the first packet.

10. The method according to claim 9, wherein the receiving a service label comprises:
receiving, by the source node, routing information corresponding to the path from a controller; and
obtaining, by the source node, the service label from the routing information.

11. The method according to claim 9, wherein the service label is a bottom label in a label stack of the second packet.

12. The method according to claim 9, wherein the service label comprises a source label, segment identifier (SID), an entropy label, a quality of service (QoS) label, a steering label, a virtual private network (VPN) prefix label, a VPN label, or a color label.

13. A controller, comprising:
at least one processor;
one or more memories coupled to the at least one processor and storing instructions, which when by the at least one processor, cause the controller to:
allocate a service label corresponding to a service processing manner of a forwarding equivalence class (FEC) and a path;
establish a mapping relationship between the service label and the service processing manner;
send the service label to a source node of the path to enable the source node to insert the service label to a first packet to obtain a second packet to be forwarded along the path to a destination node, wherein the service label is used to instruct a network node on the path to perform service processing on the second packet according to the service processing manner; and
send the mapping relationship to the destination node, wherein the destination node is enabled to pop the service label from the second packet to obtain the first packet based on the mapping relationship.

14. The controller according to claim 13, wherein the instructions, when executed by the at least one processor, further cause the controller to:
bind the service label to routing information corresponding to the path; and
send the routing information bound with the service label to the source node.

15. The controller according to claim 13, wherein the instructions, when executed by the at least one processor, further cause the controller to:
send the service label to a destination node of the path to enable the destination node to perform service processing according to the service label.

16. The controller according to claim 13, wherein the service label comprises a source label, segment identifier (SID), an entropy label, a quality of service (QoS) label, a steering label, a virtual private network (VPN) prefix label, a VPN label, or a color label.

17. A source node device, comprising:
at least one processor;
one or more memories coupled to the at least one processor and storing instructions, which when executed by the at least one processor, cause the at least one processor to:
receive a service label corresponding to a service processing manner of a forwarding equivalence class (FEC) and a path, wherein the source node device is a source node of the path;
receive a first packet;
insert the service label to the first packet to generate a second packet; and
send the second packet to a destination node corresponding to the path, wherein the service label is used to instruct a network node on the path to perform service processing on the second packet according to the service processing manner, and wherein the destination node is enabled to pop the service label from the second packet to obtain the first packet based on a mapping relationship between the service label and the service processing manner.

18. The source node device according to claim 17, wherein the instructions, when executed by the at least one processor, cause the at least one processor to:
receiving routing information corresponding to the path from a controller; and
obtaining the service label from the routing information.

19. The source node device according to claim 17, wherein the service label comprises a bottom label in a label stack of the second packet.

20. The source node device according to claim 17, wherein the service label comprises a source label, segment identifier (SID), an entropy label, a quality of service (QoS) label, a steering label, a virtual private network (VPN) prefix label, a VPN label or a color label.

* * * * *